US011356009B2

(12) United States Patent
Kornman et al.

(10) Patent No.: US 11,356,009 B2
(45) Date of Patent: Jun. 7, 2022

(54) MAGNETIC COUPLING ASSEMBLY

(71) Applicant: ZYTEC Technologies B.V., Nieuwegein (NL)

(72) Inventors: Peter Johannes Wilhelmus Kornman, HJ Wijdenes (NL); Karel Vaclav Mucek, TH Schiedam (NL)

(73) Assignee: ZYTEC TECHNOLOGIES B.V., Nieuwegein (NL)

( * ) Notice: Subject to any disclaimer, the term of this patent is extended or adjusted under 35 U.S.C. 154(b) by 904 days.

(21) Appl. No.: 16/072,582

(22) PCT Filed: Jan. 27, 2017

(86) PCT No.: PCT/NL2017/050058
§ 371 (c)(1),
(2) Date: Jul. 25, 2018

(87) PCT Pub. No.: WO2017/131524
PCT Pub. Date: Aug. 3, 2017

(65) Prior Publication Data
US 2019/0052163 A1   Feb. 14, 2019

(30) Foreign Application Priority Data

Jan. 27, 2016  (NL) .................................... 2016163

(51) Int. Cl.
*H02K 49/10* (2006.01)
*F16D 27/01* (2006.01)
(Continued)

(52) U.S. Cl.
CPC ........... *H02K 49/108* (2013.01); *F16D 27/01* (2013.01); *F16D 27/14* (2013.01); *H02K 1/32* (2013.01);
(Continued)

(58) Field of Classification Search
CPC ........ H02K 49/04; H02K 49/108; H02K 1/32; H02K 49/046; H02K 2213/09; F16D 27/01; F16D 27/14; F16D 2300/0212
See application file for complete search history.

(56) References Cited

U.S. PATENT DOCUMENTS

| 5,279,396 A | * | 1/1994 | Estaque | ................. F16D 65/128 |
| | | | | 188/218 XL |
| 5,834,872 A | * | 11/1998 | Lamb | .................... H02K 49/065 |
| | | | | 310/103 |
| 7,066,306 B2 | * | 6/2006 | Gavin | ....................... F16D 65/12 |
| | | | | 188/218 XL |

FOREIGN PATENT DOCUMENTS

| CN | 202004622 U | 10/2011 |
| CN | 202276270 U | 6/2012 |

(Continued)

OTHER PUBLICATIONS

PCT International Search Report and Written Opinion; PCT/NL2017/050058, dated Jul. 25, 2017, 19 pages.

*Primary Examiner* — Burton S Mullins
(74) *Attorney, Agent, or Firm* — KDB Firm PLLC

(57) ABSTRACT

A magnetic coupling assembly for coupling of a first rotary shaft and a second rotary shaft. The magnetic coupling assembly includes a first and second rotary hub, a sleeve, coaxial with the first rotary hub and arranged to be rotatable with respect to the first rotary hub, a first and second displacement element threadingly connected to the sleeve, and a first and a second rotatable inductor rotor arranged to co-rotate with the rotation of the first rotary hub. The first and second rotatable inductor rotors are connected to the first and second displacement element, respectively, and rotatable central magnet rotor. The sleeve includes threaded outer surfaces of opposite threading engaged by the first and (Continued)

second displacement elements so as to displace the first and second displacement elements in opposite directions.

11 Claims, 21 Drawing Sheets

(51) Int. Cl.
    *H02K 1/32* (2006.01)
    *H02K 49/04* (2006.01)
    *F16D 27/14* (2006.01)

(52) U.S. Cl.
    CPC ... *H02K 49/046* (2013.01); *F16D 2300/0212* (2013.01); *H02K 2213/09* (2013.01)

(56) References Cited

FOREIGN PATENT DOCUMENTS

| | | | |
|---|---|---|---|
| CN | 102891586 | A | 1/2013 |
| CN | 103107675 | A | 5/2013 |
| CN | 203326850 | U | 12/2013 |
| CN | 203406767 | U | 1/2014 |
| EP | 0485283 | A1 | 5/1992 |
| FR | 1180373 | A | 6/1959 |
| FR | 2864719 | A1 | 7/2005 |
| WO | 2015076673 | A1 | 5/2015 |
| WO | 2015137814 | A1 | 9/2015 |

* cited by examiner

MAGNETIC COUPLING ASSEMBLY

This is a national stage application filed under 35 U.S.C. 371 of pending international application PCT/NL2017/050058, filed Jan. 27, 2017, which claims priority to Netherlands national patent application NL 2016163, filed Jan. 27, 2016, the entirety of which applications are incorporated by reference herein.

The present disclosure relates to a magnetic coupling assembly for coupling of a first rotary shaft and a second rotary shaft.

Magnetic coupling assemblies for coupling a first shaft, for instance a drive or motor shaft, to a second shaft, for instance a load or machine shaft, are known as such. Document WO 2015/076673 A1 discloses an example of such magnetic coupling assembly comprising magnet rotors and inductor rotors spaced apart from the magnet rotors. Rotation of the first or second shaft results in rotation of the other shaft by magnetic action without there being any direct mechanical connection between the first and seconds shafts. More specifically, torque may be transferred between the magnet rotor and the inductor rotors and thereby between the first and second shaft via Lenz's law, without the drive shaft being in contact with the load shaft.

A further example of a magnetic coupling assembly is disclosed in CN 103 107 565 A. The assembly has an air gap adjustment mechanism for displacing two conductor discs relative to two magnet rotors. The air gap adjustment mechanism comprises two different portions: a first portion for displacing the first conductor disc and a second portion for displacing the second disc. The first portion includes a outer sleeve threadingly connected to an inner sleeve, wherein the inner sleeve is connected through a bearing assembly to a drive shaft. The second portion includes a number of gears for transmitting the movement of the first conductor plate into an opposite movement of the second conductor plate. The known magnetic coupling assembly has a number of disadvantages. First of all, both the first portion and the second portion of the adjustment assembly co-rotate with the rotation of the conductor disc. This means that the adjustment of the air gap cannot be accomplished when the coupling assembly is in operation. The rotation of the discs is to be stopped first before the adjustment can take place. A further disadvantage is that since essentially the entire adjustment mechanism co-rotates with the rotation of the discs, the rotating mass is relatively high and the assembly is prone to increased wear due to considerable centrifugal forces, especially at high rotation velocities.

Another disadvantage of the know coupling assembly is that all parts of the coupling assembly are connected to each other and to both the drive shaft and load shaft. This manes that the coupling assembly essentially forms one unit which puts severe requirements on the accuracy of the alignment of the drive shaft relative to the load shaft, especially when the discs are to be rotated at high velocity.

It is an object to provide a magnetic coupling assembly wherein the disadvantages of prior magnetic couplings have been reduced.

It is a further object to provide a magnetic coupling assembly which is compact, reliable, efficient, easy to install and/or has relatively low maintenance costs.

It is a further object to provide a magnetic coupling assembly with improved cooling capacity.

Adjustment Mechanism

At least one of the objects may be achieved in a magnetic coupling assembly for coupling of a first rotary shaft and a second rotary shaft, the magnetic coupling assembly comprising:
  a stationary housing (8; 118);
    a first rotary hub (4; 104) connectable to the first shaft;
    a second rotary hub (5; 105) connectable to the second shaft;
    a sleeve (80,112), coaxial with the first rotary hub (4; 104) and arranged to be rotatable with respect to the housing, the sleeve extending over the first rotary hub and arranged to be rotatable with respect to the first rotary hub (4; 104);
  a first displacement element (60; 141) a second displacement element (64; 143), both threading elements being threadingly connected to the sleeve;
  a first and a second rotatable inductor rotor (20,21; 130,131) arranged to co-rotate with the rotation of the first rotary hub (4; 104), the first and second rotatable inductor rotors being connected to the first and second displacement element, respectively;
  at least one rotatable central magnet rotor comprising a set of permanent magnets, the central magnet rotor connected to the second rotary hub (5; 105) and arranged axially between the first and second rotatable inductor rotors in order to transfer torque between the magnet rotor and the inductor rotors;
  wherein the sleeve comprises threaded outer surfaces of opposite threading engaged by the first and second displacement elements so as to displace the first displacement element and the first rotatable inductor rotor connected thereto in a first axial direction and the second displacement element and the second rotatable inductor rotor connected thereto in a second axial direction, opposite the first axial direction, upon rotation of the sleeve relative to the displacement elements.

The rotation or turning of the sleeve can be done by hand or by an actuator as will be explained later. The speed of rotation or turning of the sleeve is evidently much slower than the rotational speed of the rotors (factor 100, 500 or more).

The above defined magnetic coupling assembly has one adjustment element (i.e. the sleeve) that is able to displace both the first and second inductor rotor. Furthermore, the sleeve is positioned not only far away from the first rotor, but also at a relatively large distance from the closest conductor rotor (i.e. the second inductor rotor). Furthermore the amount of heat transferred from the conductor rotors to the displacement mechanism (i.e. the displacement elements and the sleeve, including their bearing assemblies) is relatively small. This means that the sleeve (and the associated bearing assemblies) may be less influenced by temperature variations on the assembly, especially temperature variations in the inductor rotors since heat will generated primarily in the (inductor rotor front plates of) inductor rotors, which may improve the reliability and of the entire coupling assembly. The (air) gap between an inductor rotor and the magnet rotor (which gap may be defined as the distance between the inductor rotor and magnet rotor since the inductor rotor(s) and magnet rotor are generally parallel to each other) can be adapted by simply rotating the above-mentioned sleeve with respect to the (stationary) housing. The rotation causes an axial displacement (i.e. in longitudinal direction) of the induction rotor with respect to the magnet rotor.

The (air) gap between each of the inductor rotors (which number could be 2 or more, for instance 4 or 6) and the magnet rotor can be adapted by simply rotating the above-mentioned sleeve with respect to the (stationary) housing. The rotation causes an axial displacement (i.e. in longitudinal direction) of both induction rotors with respect to the magnet rotor. Rotation of the sleeve in a first direction of rotation (around an imaginary axis in longitudinal direction) will cause the induction rotors to move away from the magnet rotor, thereby increasing the air gaps with the magnet rotor. Rotation of the sleeve in the opposite rotational direction causes the induction rotors to move towards each other and to reduce the respective axial distance to the magnet rotors, thereby reducing the air gap between the inductor plates and the magnet rotor. As will be clear to the skilled person, adaption of the (air) gaps between the inductor rotors and magnet rotor changes the transmission torque which is generated through a rotational speed difference between first and secondary shaft transmission ratio of the coupling assembly. The adaption of the air gaps may vary the transmission ratio or slip of the coupling assembly.

The sleeve and displacement elements may comprise bearing assemblies which are arranged to allow the sleeve to maintain stationary while the inductions rotors are rotating. These bearing assemblies also allow the sleeve to turn in order to axially displace the inductor rotors while the assembly is operational (i.e. while the inductor rotors are rotating at high speed).

In embodiments of the present disclosure a first bearing assembly is arranged between the sleeve and the first rotary hub. Furthermore, the first displacement element may comprise an annular outer part, an annular inner part, and a (second) bearing assembly between the annular outer part and the annular inner part. In these embodiments the second displacement element may comprise an annular outer part, an annular inner part, and a (second) bearing assembly between the annular outer part and the annular inner part as well.

Since in certain embodiments the sleeve and displacement element comprise a first and second bearing assembly, the sleeve may be rotatable relative to the housing (so as to move the inductor rotors relative to each other), but may also rotate or kept stationary relative to the induction rotors (and, of course, the magnet rotor). In other words, the displacement of the inductor rotors by rotating the sleeve can be accomplished independently from the movement of the inductor rotors (they may rotate or may be kept stationary). This makes it possible to axially displace the inductor rotors while the coupling assembly is in operation and while the induction rotors are actually rotating.

The first displacement element may be coupled to the first rotatable inductor rotor through a plurality of first pins and the second displacement element may be coupled to the second rotatable inductor rotor through a plurality of second pins. The number of pins (herein also referred to as push pins) may vary and the pins are preferably evenly distributed along the circumferential edges of the displacement elements. In certain embodiments the pins are mounted to the respective annular outer parts. In these embodiments a torque plate may be provided. The torque plate is configured to transmit the torque on the input hub (by the input shaft) onto the induction rotors so as to cause the induction rotors to co-rotate with the input hub. In specific embodiments the torque plate is configured to push against the first and second pins to transmit the rotation of the torque plate upon the inductor plates.

In embodiments of the present disclosure each of the displacement elements is combined with an inductor plate to form one, integrated entity. For instance, the annular outer parts of the first and second displacement elements may be formed by the first and second rotatable inductor rotors, respectively.

Furthermore, the sleeve may comprise a first threaded outer surface comprising left-handed threading and a second threaded outer surface comprising right-handed threading. The first and second outer surfaces may be positioned to engage upon the first and second displacement element, respectively. In other embodiments, the first and second outer surfaces are positioned to engage upon the second and first displacement element, respectively.

In order to cause the sleeve to rotate and thereby to displace the inductor rotors in axial (longitudinal) direction, an actuating mechanism may be provided. The actuating mechanism may be configured to actuate the rotation of the sleeve relative to the housing. In embodiments wherein the sleeve is not rotatable with respect to the input hub when the input is rotating, the actuating mechanism is only operated when the rotors are stopped and therefore are in stationary condition. Such actuating mechanism can be formed by a simple handle or similar element. In embodiments wherein the sleeve is mounted to be rotatable with respect to the rotating input hub, the actuating mechanism is configured to displace the one or more inductor rotors when the rotors are actually rotating.

The actuating mechanism may comprise of a worm drive or a similar actuator. In some embodiments the actuating mechanism comprises an electric motor, preferably an electric motor driving the worm screw of the worm drive. In other embodiments the worm drive is operated manually, for instance by using a handle or lever. In still other embodiments the actuating mechanism can be operated both manually and by using an electric motor.

The coupling assembly, i.e. at least the displacement elements thereof, may be configured to move the first and second rotatable inductor rotors in unison and in opposing axial directions so as to vary the air gaps with the central magnet rotor. In this way the forces exerted on the rotors and other components of the coupling assembly can be more evenly distributed over the construction. The inductor rotors may even be displaced in an equal opposite axial movement of the two rotatable inductor rotors.

In order to set the transmission ratio or slip of the coupling assembly a control unit (for instance a computer connected to the actuating mechanism) connected to the actuating mechanism may be programmed to control the axial distance between the magnet rotor and each of the inductor rotors.

In a preferred embodiment the first shaft is a drive shaft, for instance a motor shaft, and the second shaft is a load shaft, for instance a pump shaft. This has the advantage that the heavy and robust part of the coupling assembly is connected to the drive mechanism (for instance the motor), while the light part of the coupling assembly is connected to the load, for instance a pump.

Cooling Mechanism

In operation, magnetic coupling assemblies have the tendency to warm up to such an extent that active cooling is needed to avoid damage to the construction. Typically this is accomplished by spraying water all over the coupling assembly and accumulate this water in a receptacle positioned beneath the coupling assembly. This has a number of disadvantages. The active cooling needs energy (for instance a pump for generating the water pressure to spray it over the construction. Furthermore, cooling is generally most needed (deep) inside the coupling and spraying water over the housing of the coupling assembly is sometimes not enough to sufficiently cool the assembly. Therefore, and in accordance with another (independent) aspect of the present disclosure, a magnetic coupling assembly for coupling of a first rotary shaft and a second rotary shaft is provided, the magnetic coupling assembly comprising:

a second rotary hub (5; 105) connectable to the second shaft;

at least one rotatable inductor rotor (20,21; 130,131) arranged to co-rotate with the rotation of the first rotary hub (4; 104);

at least one rotatable magnet rotor (30; 129) comprising a set of permanent magnets, the magnet rotor connected to the second rotary hub (5; 105) and arranged to co-rotate with the rotation of the second rotary hub (4; 104), wherein the at least one rotatable induction rotor and the at least one rotatable magnet rotor are arranged so as to transfer torque between the at least one magnet rotor and the at least one inductor rotor;

wherein at least one rotatable induction rotor (20,21; 130, 131) comprises a central opening (41) and further comprises:

an inductor rotor front plate (24,26) facing the magnet rotor (30; 129) and comprised of a non-magnetic electrically conductive material;

an inductor rotor back plate (20a,21a) connected to the back side of the inductor rotor front plate (24,26) and comprised of magnetic material;

one or more passages inside the rotatable induction rotor between the inductor rotor front plate and the inductor rotor back plate and arranged for allowing the passage of ambient fluid, such as ambient air, from the central opening (41) radially outward so as to cool the inductor rotor front plate.

The one or more passages may be formed by a plurality of channels arranged in the rotatable induction rotor. Furthermore, in embodiments wherein the inductor rotor comprises a plurality of connecting elements, for instance pins, between the inductor rotor front plate and inductor rotor back plate or integrally formed with the inductor rotor front plate and/or the inductor rotor back plate, the one or more passages may be formed by the space between these connecting elements.

The movement of the fluid (e.g., air flow) is generated by the centrifugal forces caused by the rotation of the inductor rotor itself and therefore provides a passive cooling of the magnetic coupling assembly (i.e. in contrast to active cooling which requires further technical measures, for instance spray nozzles or similar active cooling components).

In an embodiment the channels are tubular enclosed channels. The channels are enclosed (i.e. not open at one side except for an entrance opening at the beginning of the channel and an exit opening at the end of the channel). The (central) opening may be an annular opening between the circumferential inner side of the induction rotor and the outer surface of the first rotary hub, although in other embodiments the opening takes a different shape.

The entrance openings may be radial entrance openings to allow the air to be radially enter the channels. Similarly the exit openings may be radial exit openings to allow the air to be radially exit the channels. However, in other embodiments, at least one or all of the entrance openings and/or exit openings may be axial entrance/axial exit openings so as to allow the air to be enter/exit the conductor in axial direction.

The entrance opening may be configured so as to receive relatively cool air (for instance, ambient air, i.e. air from outside the magnetic coupling assembly. The exit opening is configured to discharge relatively warm air (i.e. air that has entered the entrance opening and that has travelled through the channels).

In embodiments of the present disclosure the circumferential inner side of the inductor rotor arranged around the central opening is configured to suck ambient air into the channels in the induction rotor and force the air to flow through the channels when the induction rotor is rotating. The at least one inductor rotor may comprises multiple vanes arranged along the circumferential inner side (and/or outer side) of the induction rotor. These vanes may be configured to induce an air pressure difference between the entrance and exit openings when the inductor rotor is rotating. The pressure difference causes ambient air from outside the magnetic coupling assembly to enter into the entrance openings of the channels and flow towards the exit openings thereby cooling at least the inductor rotor front plate of the inductor rotor. In order to cause the flow of air inside the channels the above-mentioned vanes may extend in a generally radial direction.

In embodiments of the present disclosure the vanes are formed by the end portions of the walls or pins formed between neighbouring channels. Alternatively or additionally, the vanes are formed by separate elements (i.e. separate from the walls of the channels). These elements can be arranged along the circumferential inner side of the induction rotor and aligned with the entrance openings of the channels in the induction rotor so as to cause a suitable flow of ambient air into the channels.

In embodiments of the present disclosure the entrance openings of the channels are situated along the circumferential inner side of the induction rotor front plate and the exit openings are situated in the circumferential outer side of the induction rotor front plate. This makes it possible to cool the inductor rotor in a uniform manner, The inductor rotor front plate is the plate that will be heated as a result of the Eddy currents and therefore the inductor rotor front plate will generally be heated more than the inductor rotor back plate. This means that the inductor rotor front plate should be cooled in the first place. Cooling of the induction rotor back plate is not needed or at least less so. Consequently, in further embodiments of the present disclosure, the channels are formed of grooves made in the inductor rotor front plate (preferably made only in the inductor rotor front plate and not in the inductor rotor back plate, although in other embodiments grooves are additionally formed in the inductor rotor back plate). The grooves are covered by the induction rotor back plate placed against the inductor rotor front plate, for instance by connecting the inductor rotor back plate in an abutting manner to the inductor rotor front plate. In other embodiments the channels are formed by a plurality of short walls parts placed one after the other or a plurality of pins arranged between the front plate and back plate or integrally formed with the front plate and/or the back plate. The pins are suitably arranged between the front and back plate so that channels are formed along which air is forces to move as a result of the centrifugal forces exerted in the air particles.

As mentioned above, the fluid flow may be generated by creating a local low pressure area at the central opening so that relatively cool fluid (air) from the environment is sucked into the opening and reaches the space between the inductor rotor and the magnet rotor. In order to help create a sufficiently low pressure the inductor rotor may have multiple vanes arranged along the circumference of the central opening. The rotation of the inductor rotor causes the vanes to create the low pressure. Furthermore, the vanes may be positioned such that the air sucked in by the rotation of the inductor rotor (centrifugal force) is guided into several channels provided in the inductor rotor, especially in the (copper) front (internal) plate of the inductor rotor. In this manner cool air is guided as closely as possible through parts of the inductor rotor that are particularly strongly heated by the magnetic coupling action. Therefore, in a further embodiment, the at least one inductor rotor comprises a circumferential chamber in which multiple radial vanes are arranged for inducing a fluid flow through the central opening and guiding the induced fluid flow through channels in the inductor rotor.

Preferably the channels in the inductor rotor have generally curved shapes to provide one or more curved trajectories for the passage of fluid from the central opening radially outward back to the environment. In further embodiments the channels in the inductor rotor comprise a first set of channels curved in a first direction to provide a passage of cooling fluid when the inductor rotor is rotating in a first rotational direction and a second set of channels curved in a second direction opposite the first direction to provide a passage of cooling fluid when the inductor rotor is rotating in a second rotational direction, opposite the first rotational direction. Other possibilities are embodiment wherein the channels are formed by pins and/or small wall elements (vanes) to increase the surface area.

Further advantages, features and details of the present invention will be elucidated on the basis of the following description of several preferred embodiments thereof. Reference is made in the description to the accompanying figures, in which:

FIGS. 3 and 4 are partly cut-away cross-sections of the first embodiment, wherein FIG. 4 shows a state wherein the gap between the inductor rotors and magnet rotor is relatively small and FIG. 3 a state wherein the gap between the inductor rotors and magnet rotor is relatively large;

FIGS. 16-18 are cross-sections of a third embodiment of a magnetic coupling assembly, wherein FIG. 17 shows a state wherein the gap between the inductor rotors and magnet rotor is relatively small and FIG. 18 a state wherein the gap between the inductor rotors and magnet rotor is relatively large;

DETAILED DESCRIPTION OF EMBODIMENTS

Figure 1:
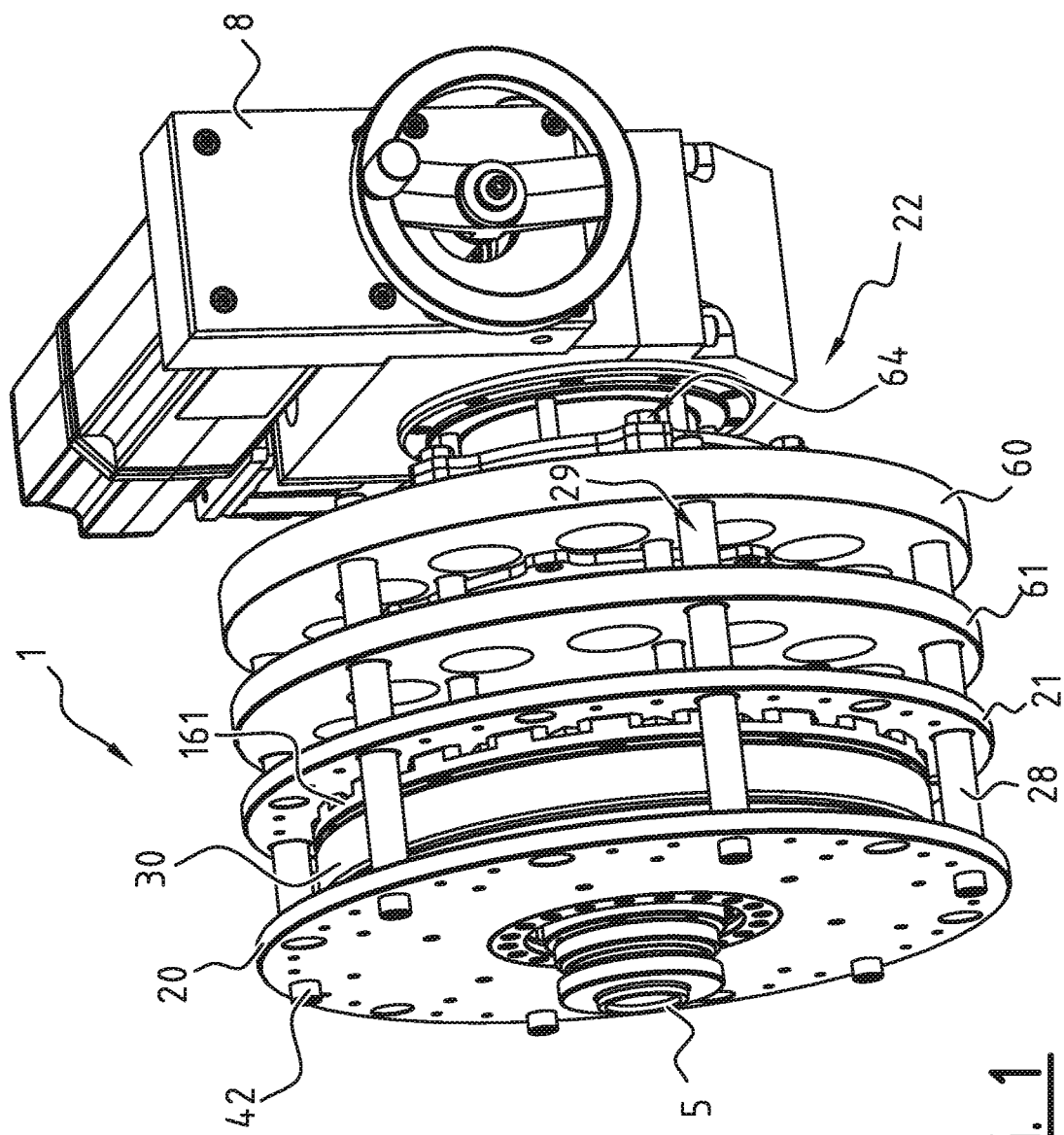
FIGS. 1 and 2 are side views of a first embodiment of a magnetic coupling assembly.
Figure 2:
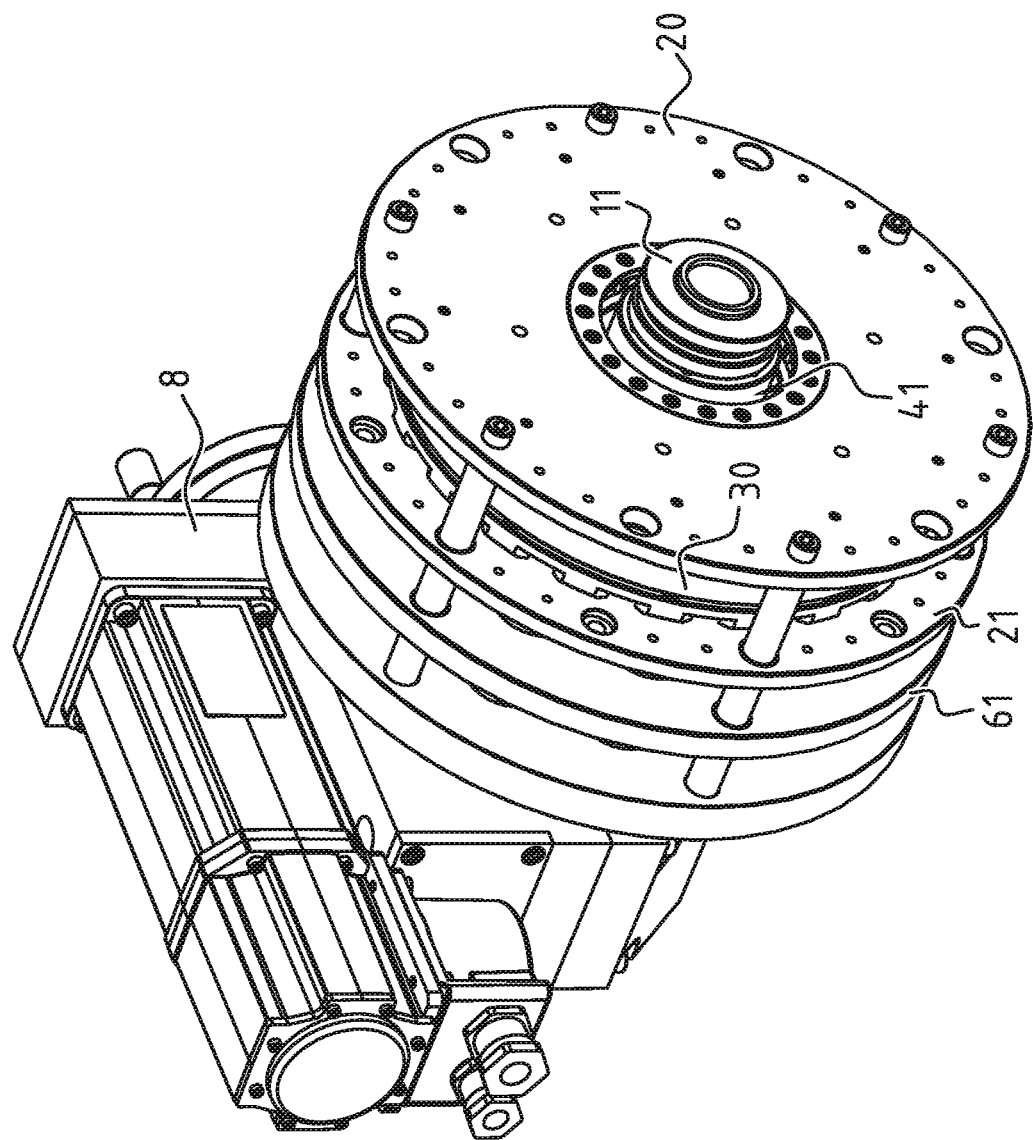
Figure 3:
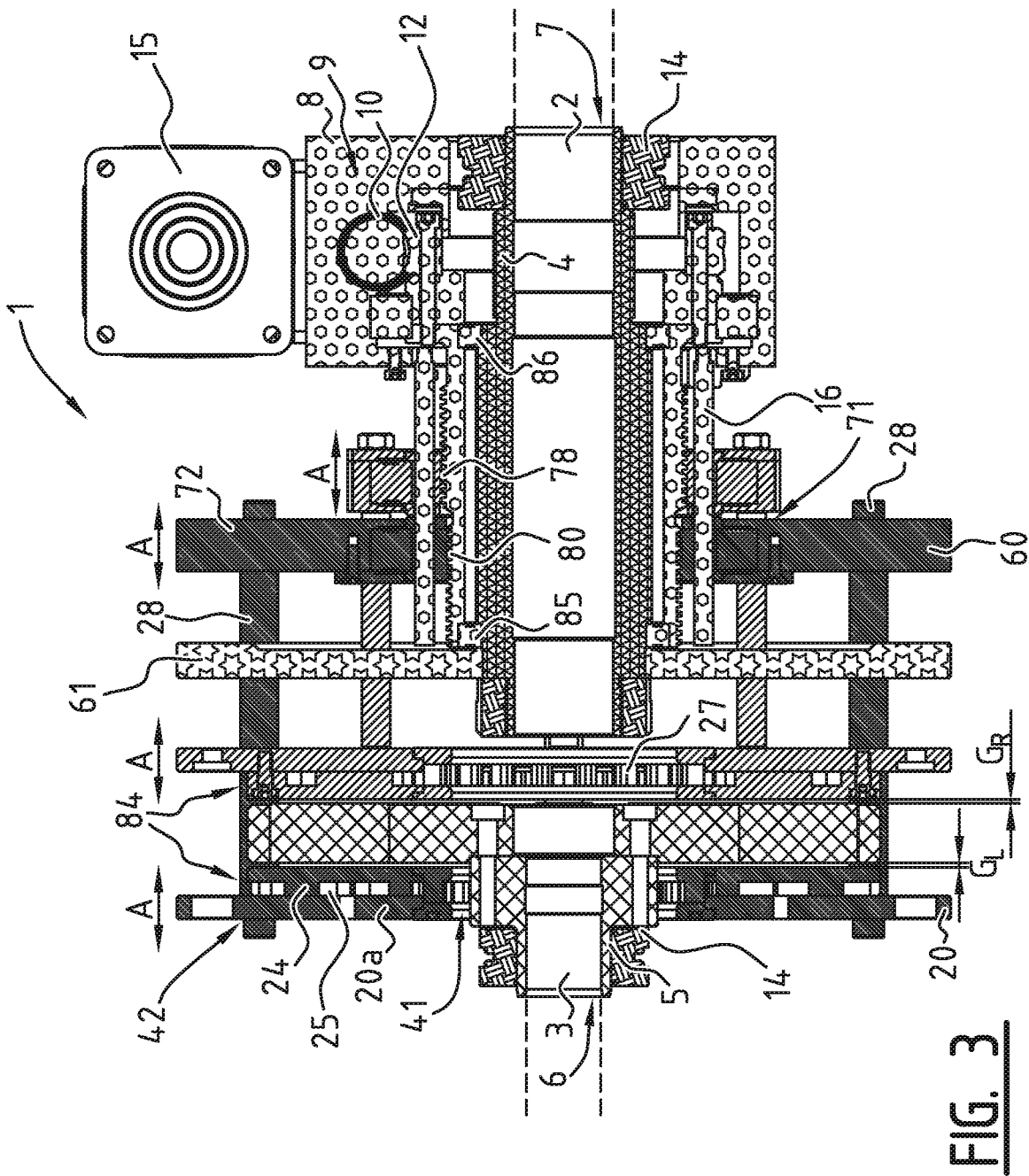

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. For instance, when throughout the present specification reference is made to "a" bearing, this reference is intended to include two or more bearing (elements) or a bearing assembly.

As will be apparent to those of skill in the art upon reading this disclosure, each of the individual embodiments described and illustrated herein has discrete components and features which may be readily separated from or combined with the features of any of the other several embodiments without departing from the scope of the present invention. Any recited method can be carried out in the order of events recited or in any other order which is logically possible.

FIGS. 1-9 show a first embodiment of a magnetic coupling assembly 1, while FIGS. 10-15 show a second embodiment. Since the first and second embodiments are identical to a considerable extent, their description is here combined.

The coupling assembly 1 comprises a rotary input hub 4 that can be coupled to an input shaft 2 (herein also referred to as a drive shaft or motor shaft 2) of a driving motor (not shown), for instance an electric engine, and a rotary output hub 5 that can be coupled to an output shaft 3 (herein also referred to as a load shaft or machine shaft) of a load, for instance a pump or similar device. The magnetic coupling assembly is configured to control the rotational speed of the output hub 5, at a speed reduced in increased from the rotational speed of the drive shaft 2 in an essentially contactless manner. The coupling to the input and output shaft can be accomplished by the use of conical sleeves or similar coupling devices.

The magnetic coupling assembly 1 comprises 1 a stationary housing 8 in which an actuating mechanism 22 is arranged. In the shown embodiment the actuating mechanism 22 comprises a worm drive 9. The worm drive 9 comprises a worm screw 10 that meshes with a worm gear 12. The worm screw can be controlled manually by operating a handle or wheel 13 or by controlling an electric motor 15 connected through gear wheels 17 and 18 with the worm screw 10 of the worm drive 9. Rotation of the worm screw 10 results in rotation of the worm gear 12 around an imaginary axis 19 parallel to the axial direction (A). Rotation of the worm gear 12 results in the rotation of a threaded sleeve 80 mounted to the worm gear. More specifically, the sleeve 80 is coaxial with and arranged around the above-mentioned rotary input hub 4 that is coupled to the drive shaft 2 (rotation direction R, FIGS. 5 and 10). Between the inner surface of the sleeve 80 and the outer surface of the input hub 4 a bearing assembly 85,86 is arranged in order to allow the sleeve 80 and the input hub 4 to rotate relative to each other.

The magnetic coupling assembly 1 further comprises a rotatable magnet rotor 30 on both sides of which of rotatable inductions rotors 20,21 are arranged. The magnet rotor 30 is connected through screws 31 to a rotary output hub 5. The output hub 5 comprises a central opening 6 into which and end of the load shaft 3 can be removably mounted. Similarly an end of the drive shaft 2 can be removably mounted inside an opening 7 of a rotary input hub 4. The connection between the drive shaft 2 or load shaft 3 on the one hand and the input hub 4 and output hub 5 can be accomplished by coupling devices 14, such as clamping sleeves or similar constructions.

The inductor rotor referred to in this disclosure typically comprise a non-magnetic electrically conductive material, for instance copper, aluminium, or brass, backed by a magnetic material, for instance iron or steel. More specifically, an induction rotor may comprise an inductor back plate comprised of a magnetic material and an inductor front plate comprised of the non-magnetic electrically conductive material.

Due to the magnetic forces between the magnet rotor 30 and the induction rotors 20,21 any rotation of the input hub 4 (to which the drive shaft 2 may be connected) is transmitted to rotation of the output hub 5 and therefore rotation of the load shaft 3. The transmission ratio between the rotation of the input hub 4 and the rotation of the output hub 5 depends amongst others on the magnetic field strength between the magnet rotor 30 and the induction rotors 20,21. The magnetic field strength between the magnet rotor 30 and the induction rotors 20,21 can be changed by adjustment of the gap between either of the inductor rotors 20,21 and the magnetic rotor 30, as will be explained hereafter.

Between the output hub 5 and the inductor a gap formed by opening 41 is present so that the magnet rotor 30 and the output hub 5 are arranged to rotate freely and essentially friction less relative to the remaining part of the assembly. In another embodiment (not shown) a bearing is arranged between the first inductor rotor 20 and the output hub 5. The bearing allows the magnet rotor/output hub and the inductor rotor to rotate relative to each other. In this manner the output hub 5 and input hub 4 can be maintained more easily in their coaxial arrangement, at the expense of a slightly increased friction.

Figure 4:
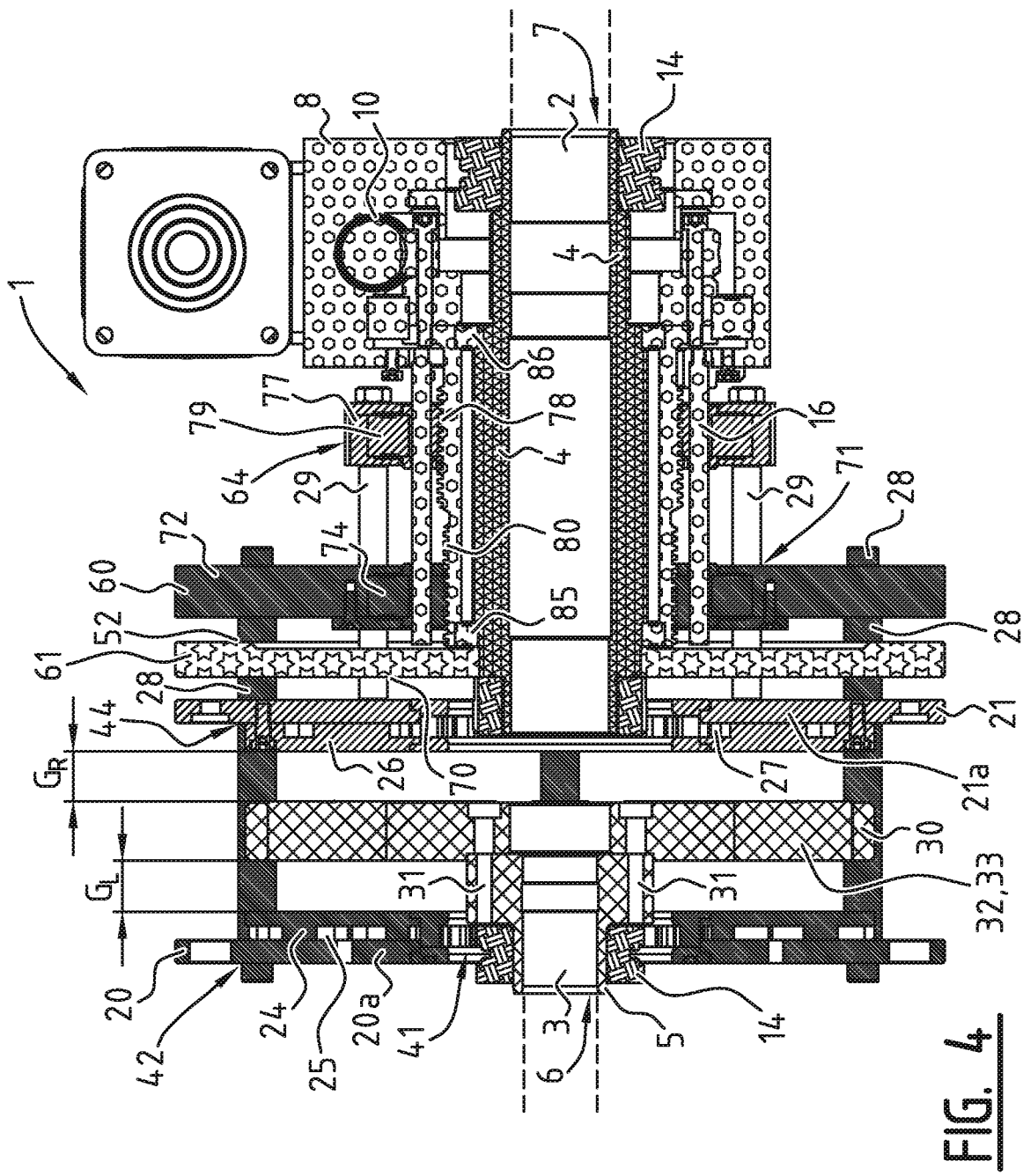
Figure 5:
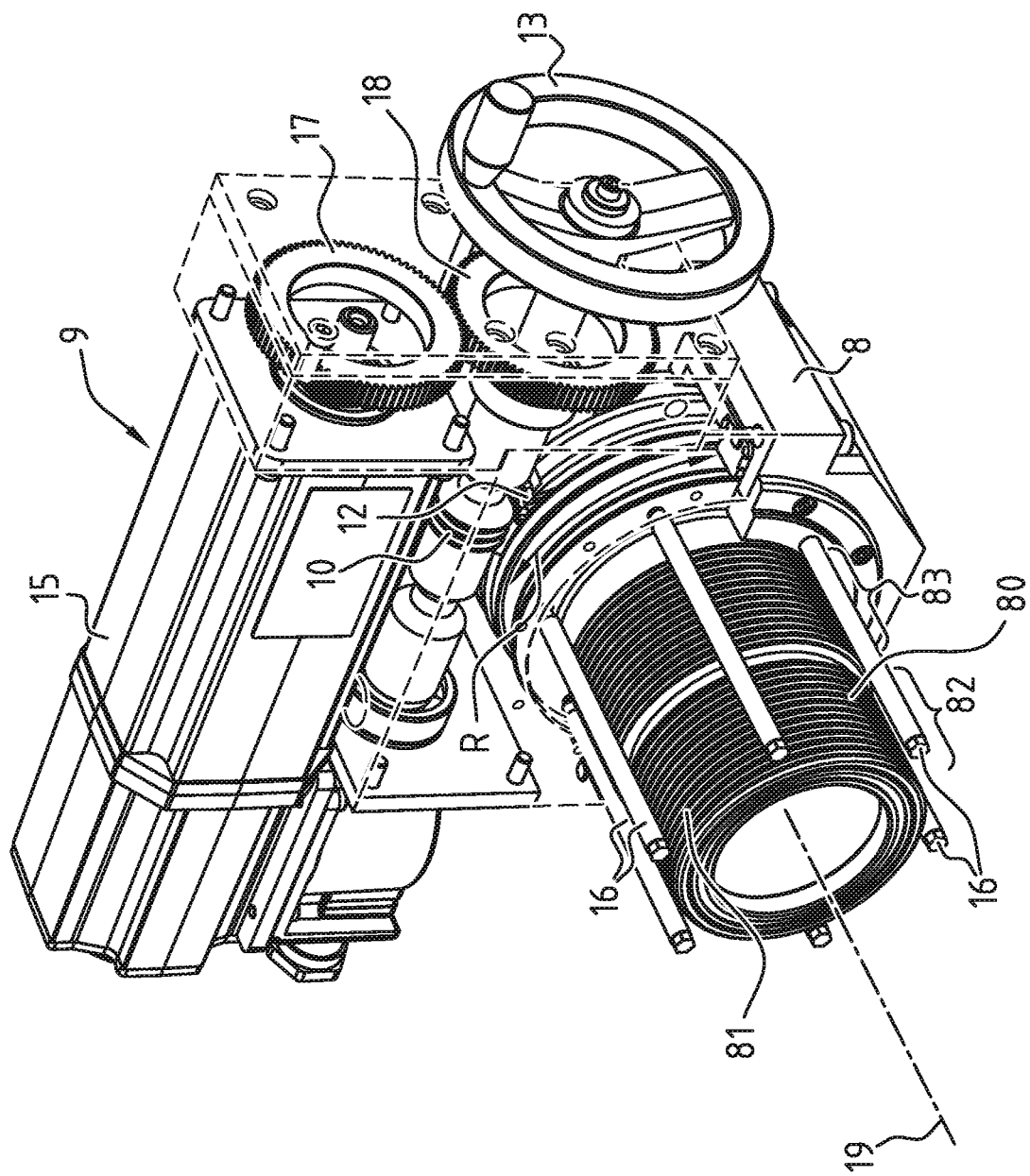
FIGS. 5-9 are partly cut-away views of components of the first embodiment.

The magnetic rotor 30 contains a number of permanent magnets 32,33 arranged close to its circumferential edge. The permanent magnets are arranged in an alternating arrangement, i.e. the poles of the magnets 32,33 are facing axially outwardly in an alternating north/south pattern. Referring to FIGS. 4 and 5 the permanent magnets 32,33 of the magnetic rotor 30 are spaced by air gaps ($G_L$, $G_R$) from inductor rotors 20,21, respectively. The air gaps may differ from each other, but usually the air gaps will be essentially equal. made from electrically conducting but non magnetic material (for example copper, aluminium, brass and the like).

Each of the inductor rotors 20,21 may comprise one or more electro-conductive (front) elements or inductor rotor front plates (for instance front plate-like elements or differently shaped elements, each of the inductor rotor plates facing a magnet rotor), optionally backed by one or more inductor rotor back plates. The electro-conductive plate is made of electro-conductive material and/or essentially non-magnetic material, for instance copper, aluminium, brass, lead or the like. In the shown embodiments the inductor rotors comprise an inductor rotor back plate 20a,21a and a co-rotating inductor rotor front plate or front element 24,26. The inductor rotor front plate 24,26 may be connected to the inductor rotor back plate 20a,21a, but in other embodiments the inductor rotor back plate and the inductor rotor front plate of an induction rotor extend at a small mutual distance. In the inductor rotor front plate or front element 24,26 a number of channels 25,27 is arranged, wherein the channels 25,27 are shaped so as to allow cooling air to flow along the surface of the inductor rotor back plate and/or inductor rotor front plate, as will be explained later.

Figure 6:
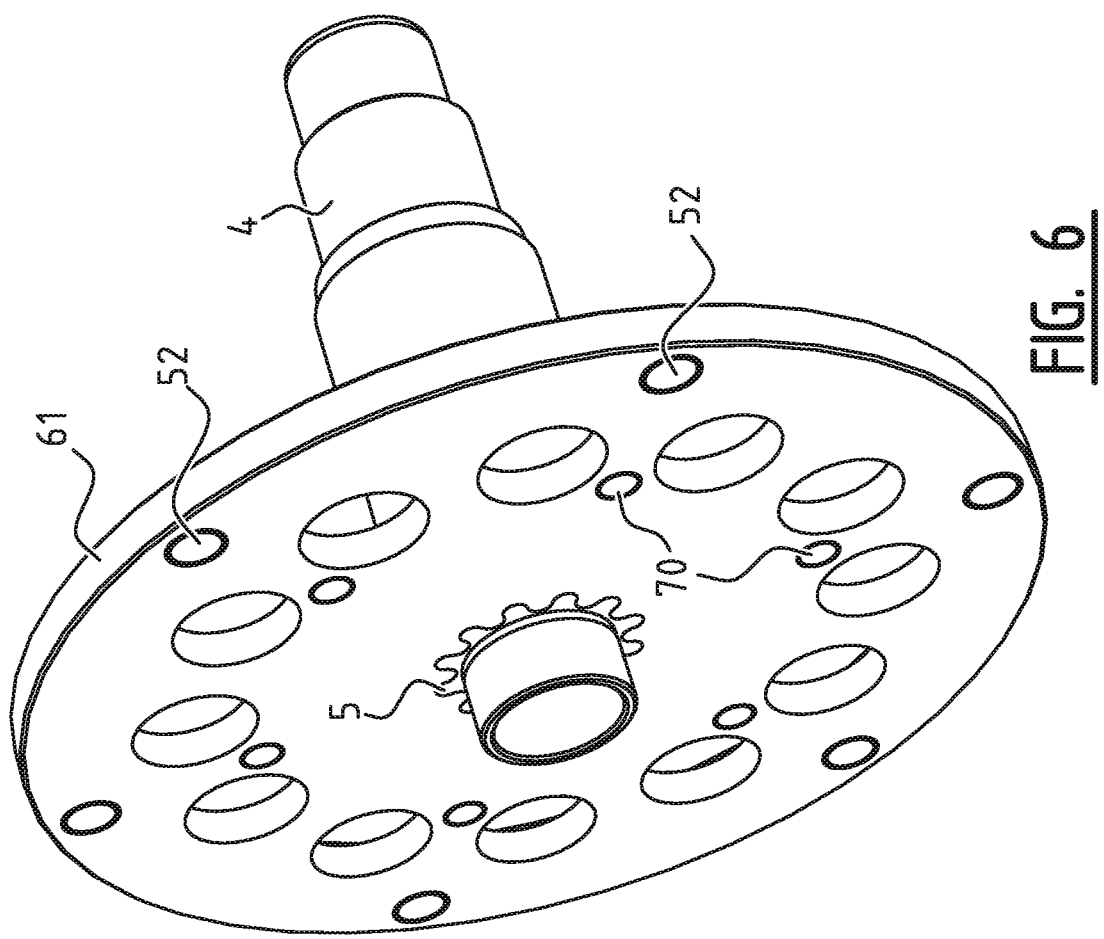
Figure 7:
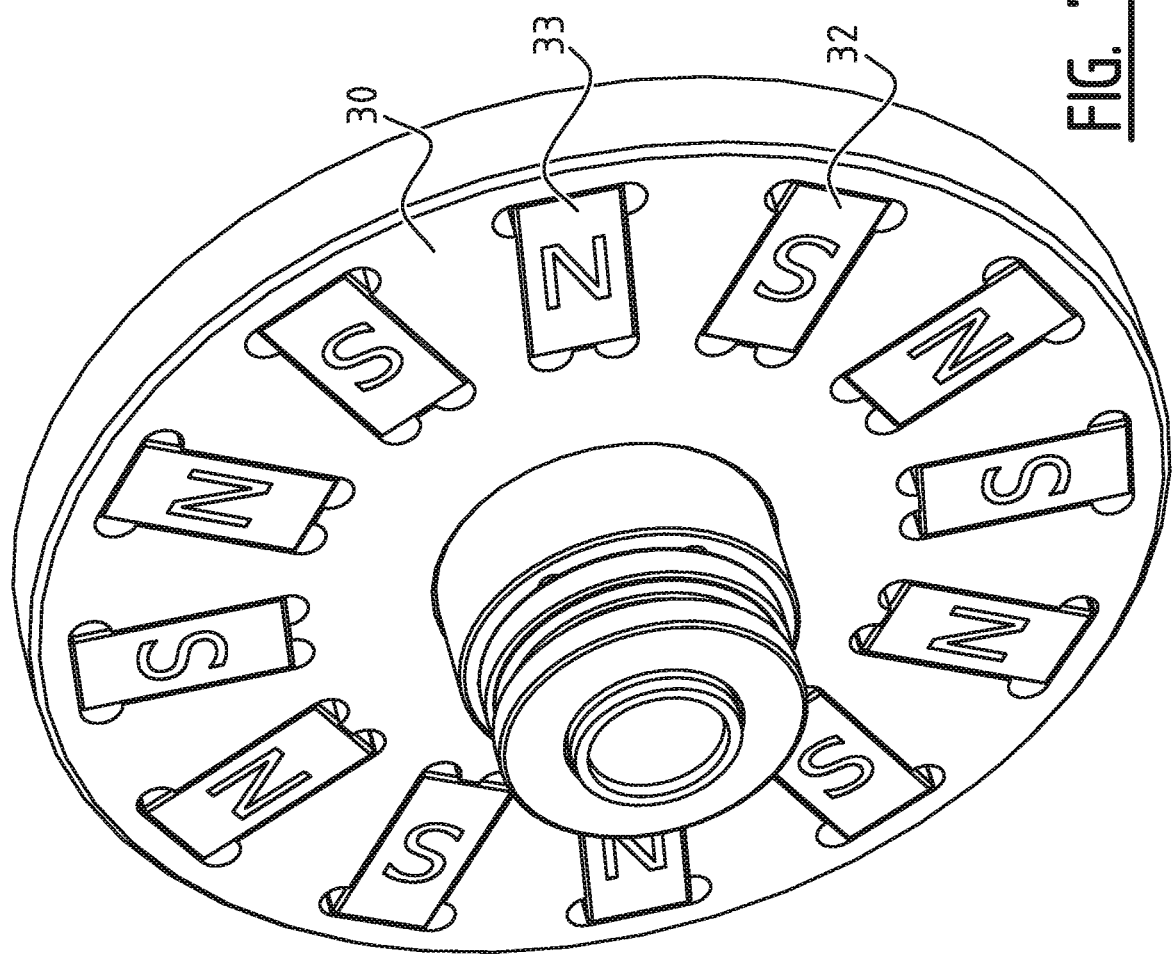
Figure 8:
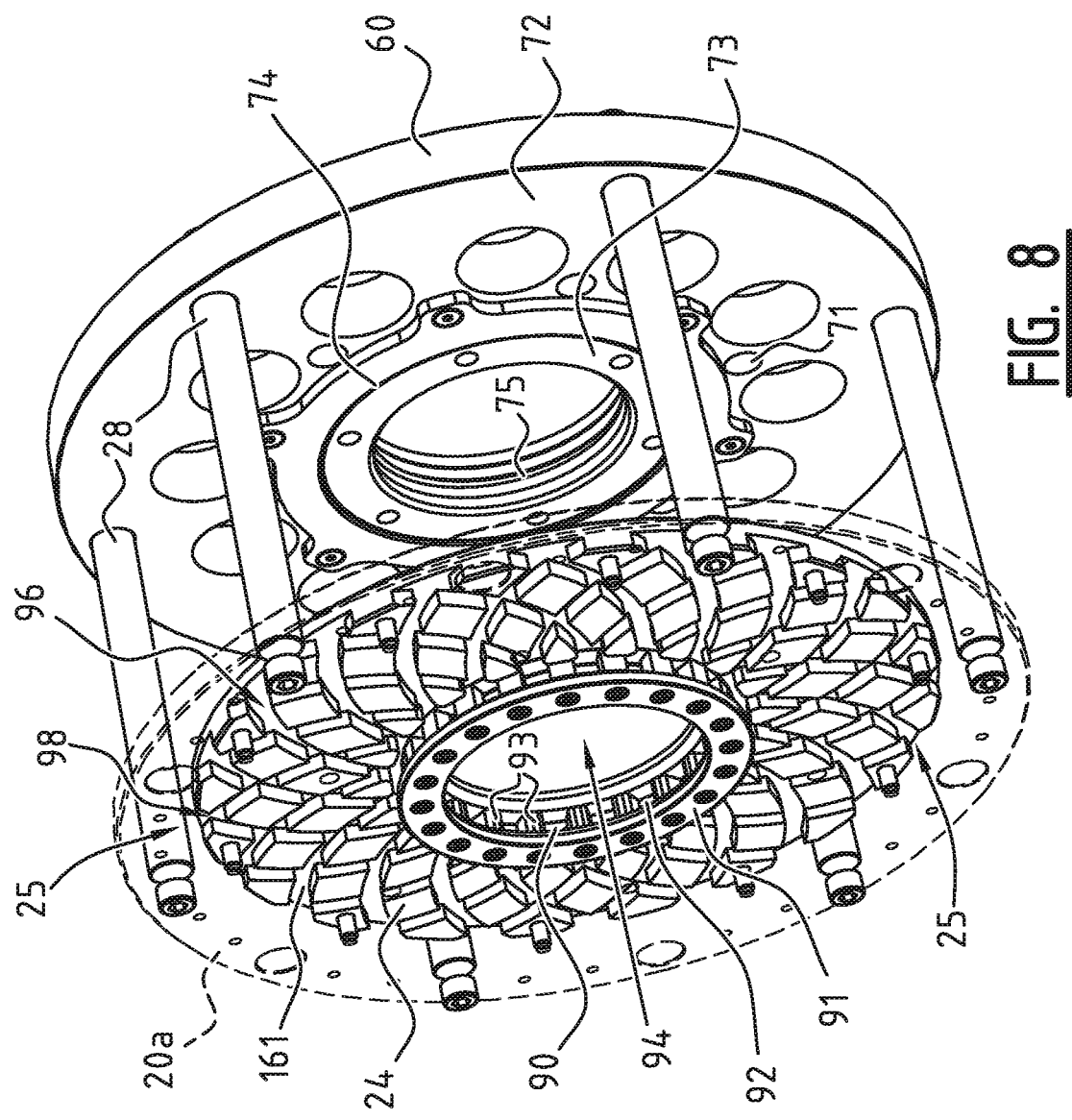
Figure 9:
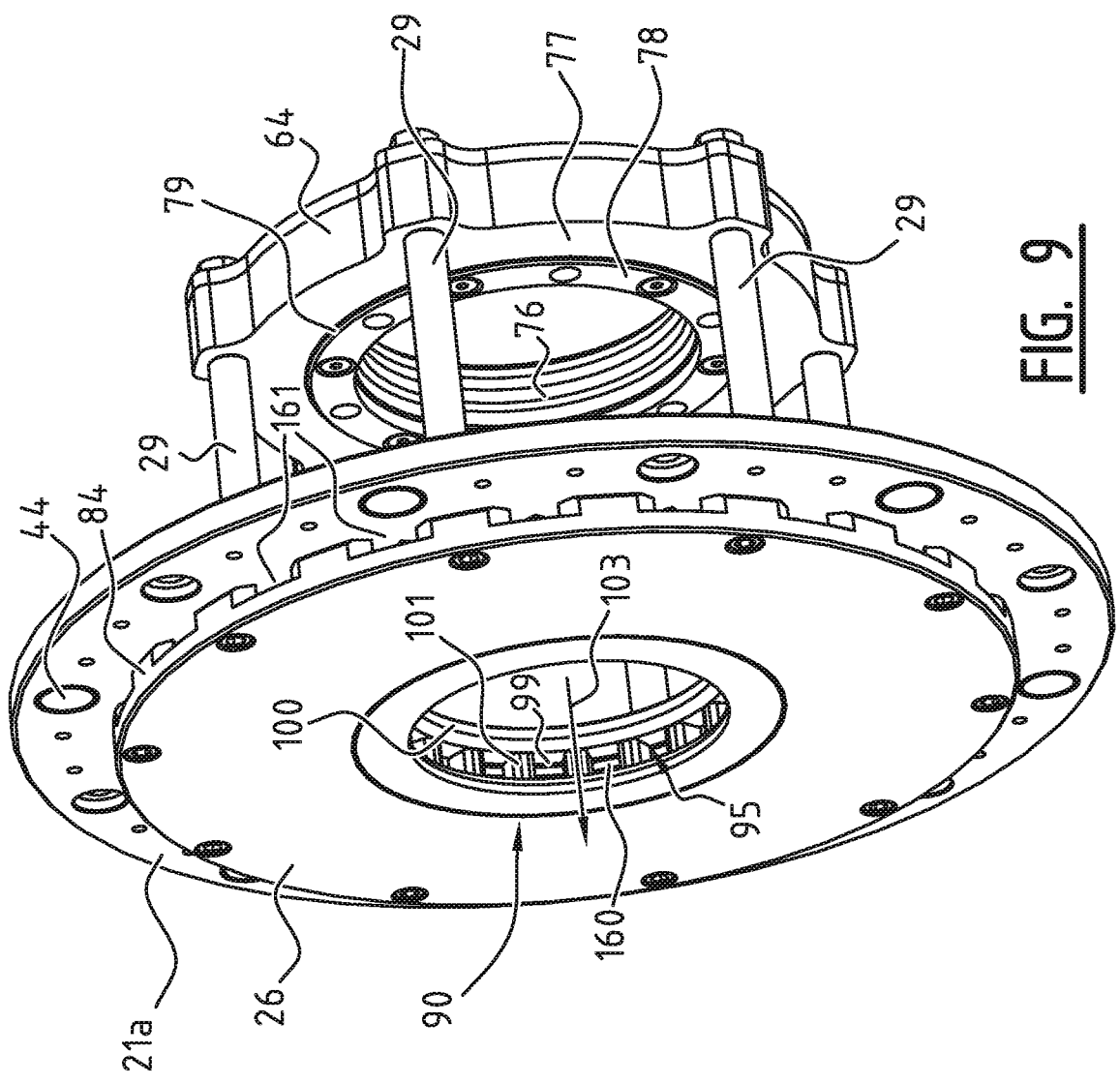
Figure 10:
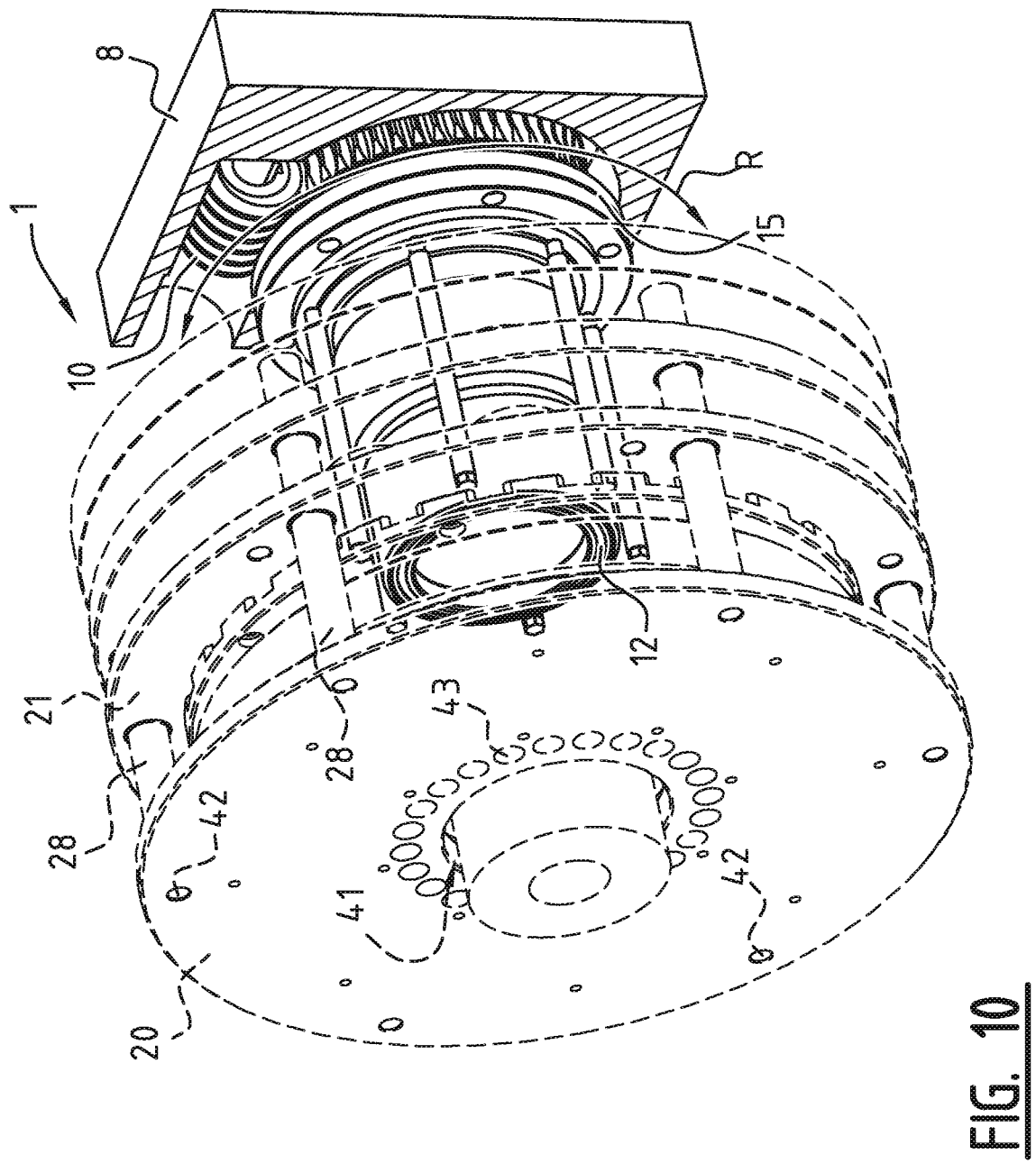
FIGS. 10-15 are views of a second embodiment of a magnetic coupling assembly.
Figure 11:
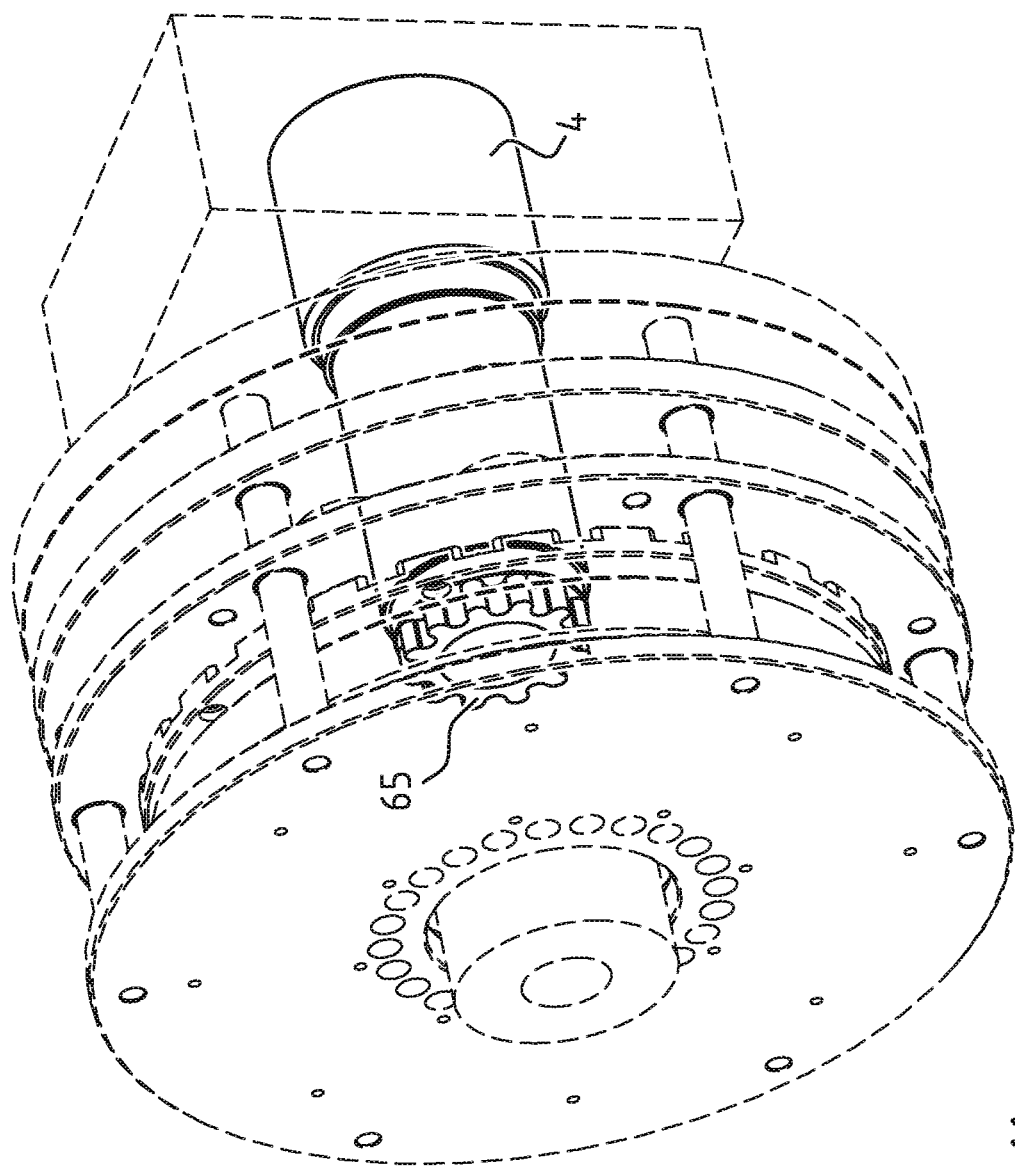
Figure 12:
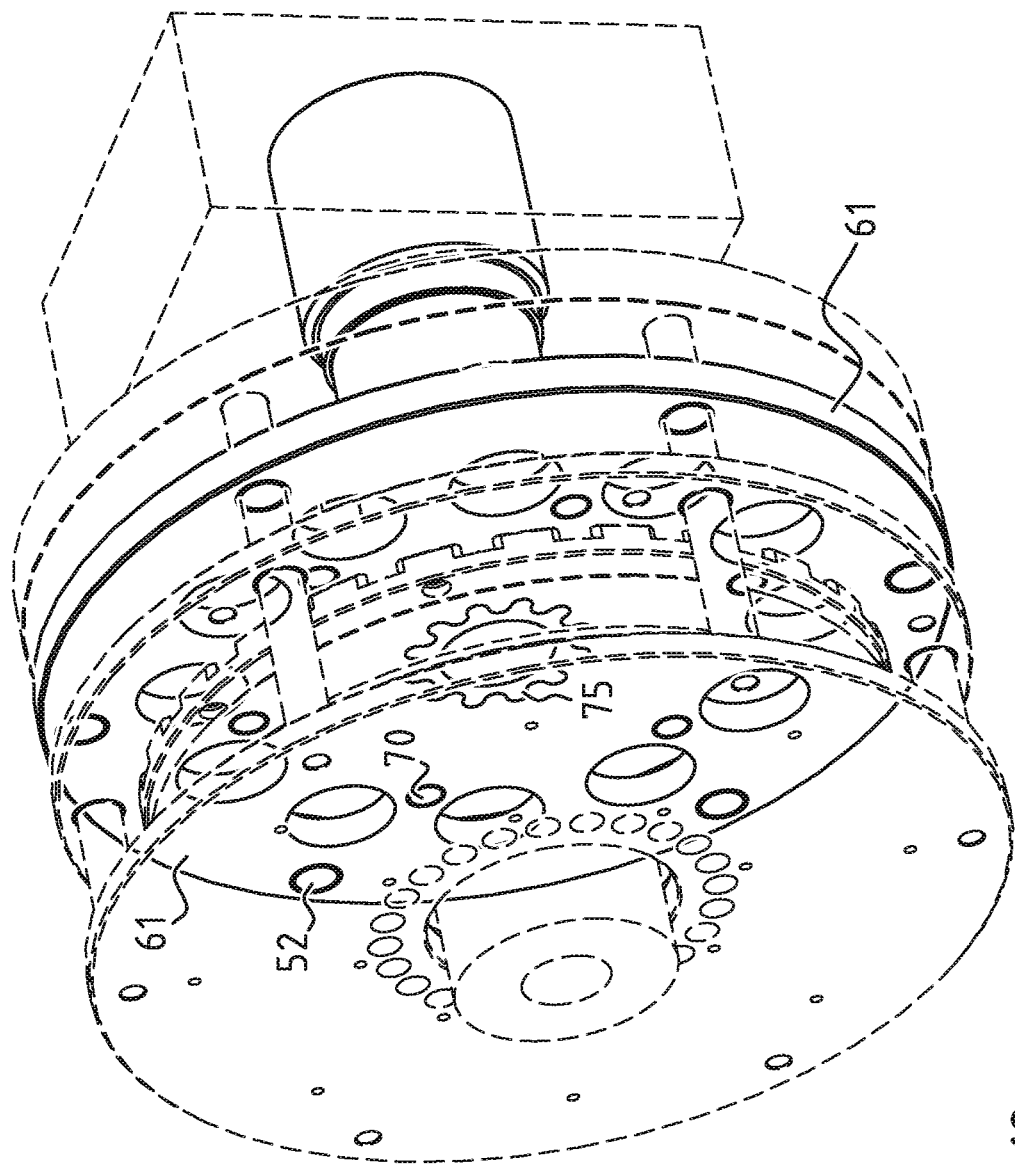
Figure 13:
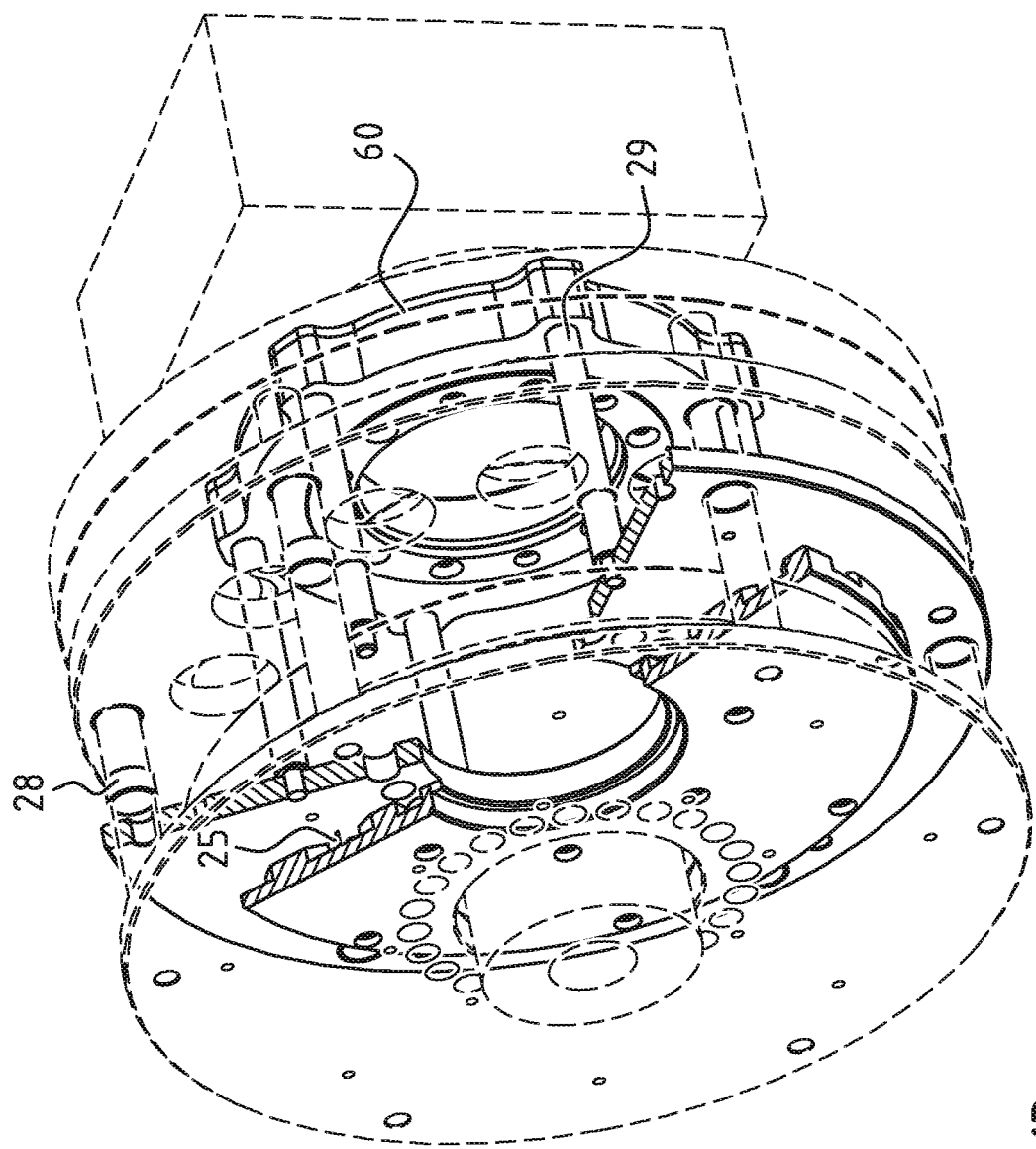
Figure 14:
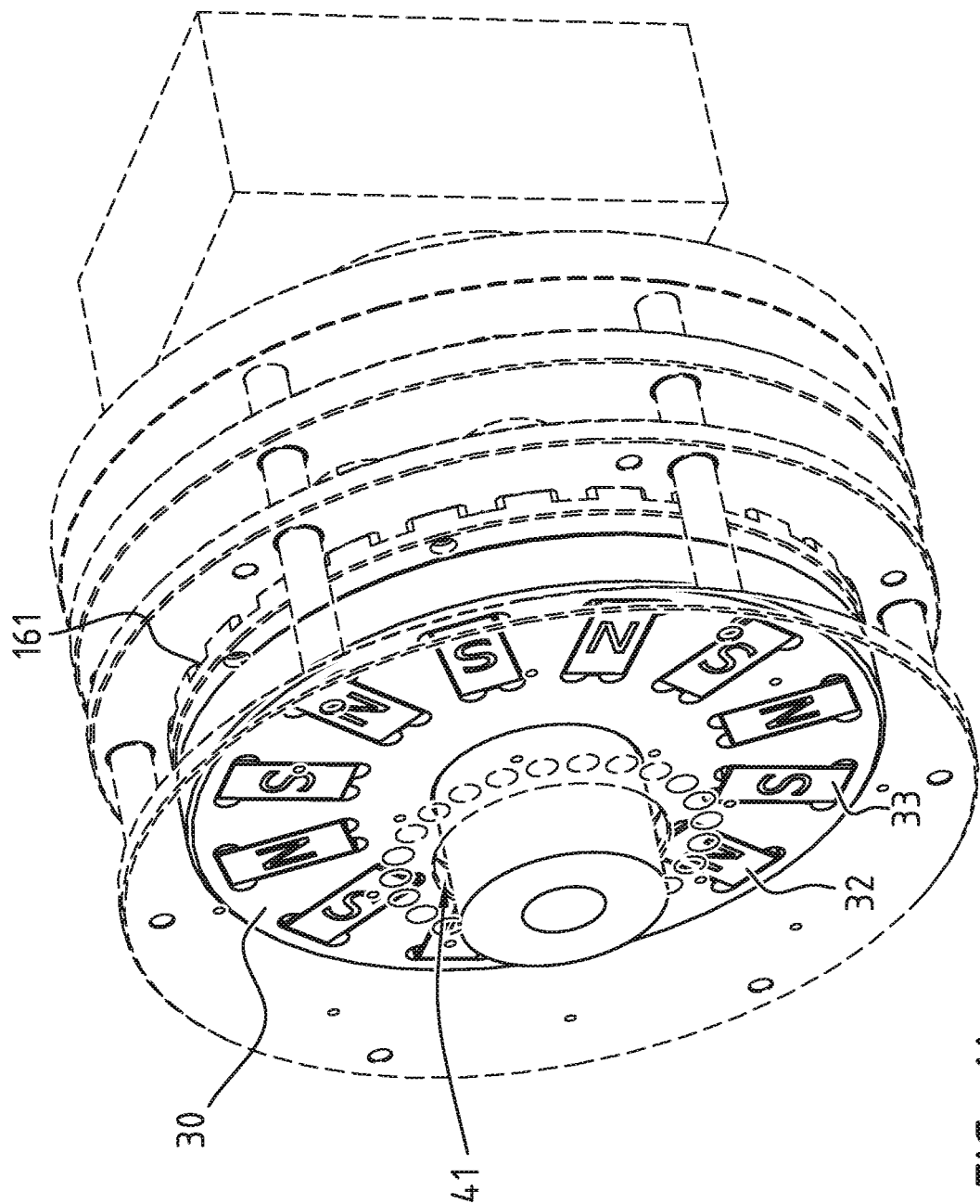
Figure 15:
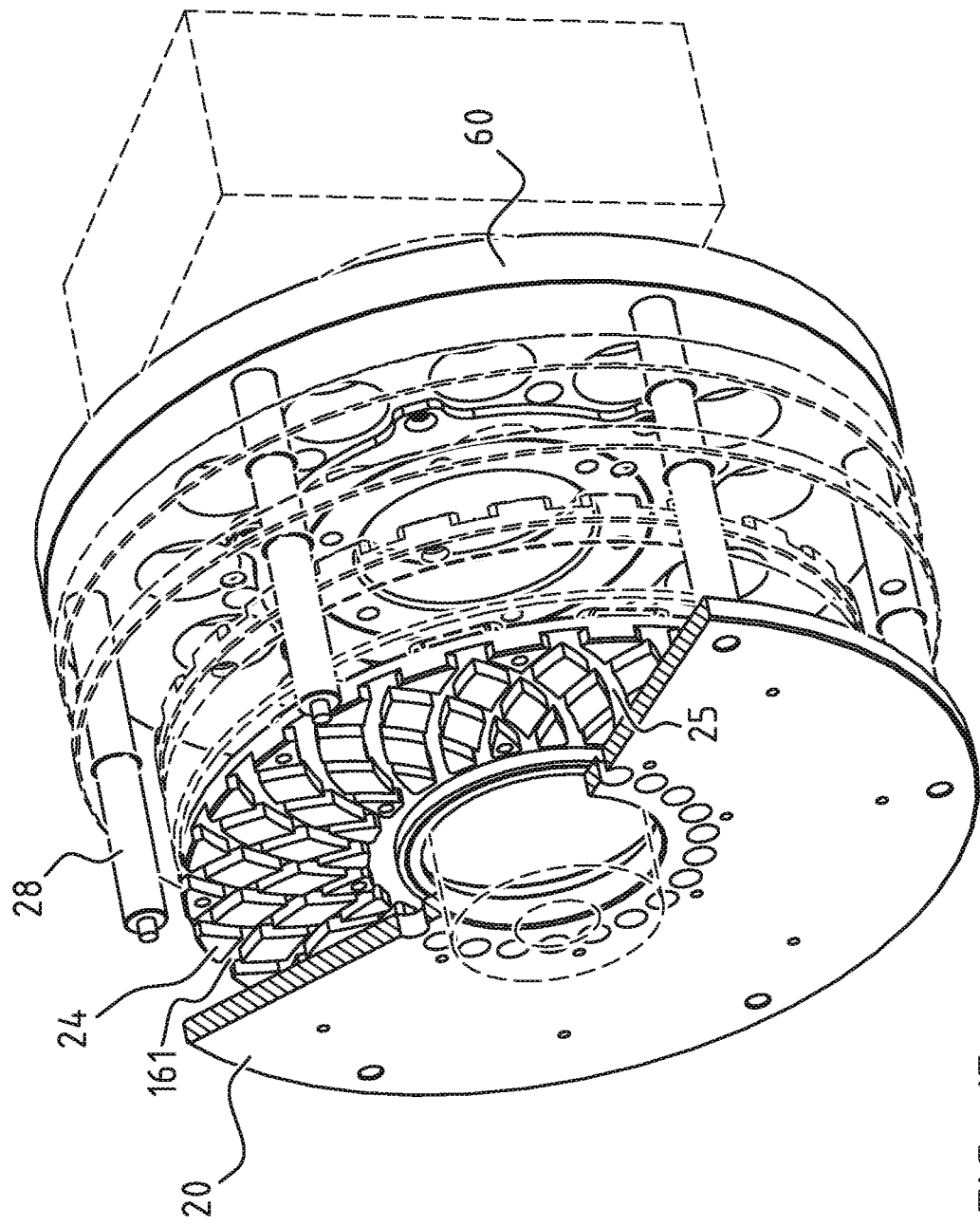
Figure 16:
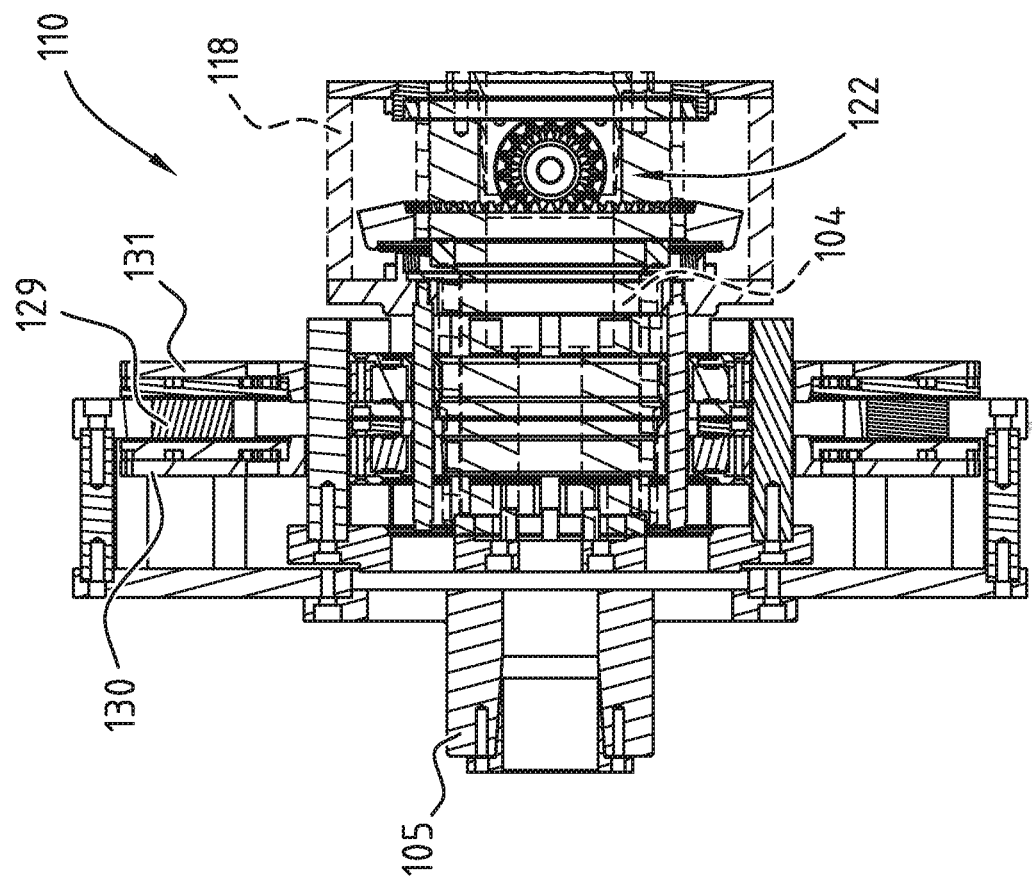

The assembly 1 further comprises a torque rotor 61 for transmitting the rotation (torque) of the input hub 4 to the induction rotors 20,21. The torque rotor 61 is fixed to the input hub, for instance through means of a spline connection element 65 as shown in FIGS. 6 and 11. This means that the torque rotor 61 co-rotates with the input hub 4. The rotation of the torque rotor 61 is directly transmitted to both of the induction rotors 20,21 because each of the inductions rotors is connected to the torque rotor 61 through means of a number of inner push pins 29 located at radially inner positions and a number of outer push pins 28 located at a number of radially outer positions, radially further outward than the circumferential edge of the magnet rotor 30. The push pins 28,29 extend through openings provided in the torque rotor 61 so that the push pins cause the induction rotors to co-rotate with the rotating torque rotor, but still allow the inductor rotors to be displaced in axial direction (A) relative to the torque rotor 61, as will be explained hereafter.

The above construction further enables the inductor rotors 20,21 to be connected to each other and to rotate synchronously without interfering with the rotation of the magnet rotor 30. In the shown embodiment the number of outer push pins 28 is six and the number inner push pins 29 is six as well. The number of push pins may however vary. Preferably the locations of the push pins are evenly distributed along the surface of the induction rotors 20,21. The outer push pins 28 are fixed to the first induction rotor 20, for instance by sliding the threaded end of a push pin through a corresponding opening 42 (FIG. 1) in the induction rotor 20 and applying a nut (shown) to the push pin. Similarly, the outer push pins 28 can be mounted to a first push element or displacement element 60. As mentioned above, the outer push pins 28 are not fixedly mounted to the first induction rotor 21 and the torque rotor 61. Due to the presence of openings 44 and 52 in the second induction rotor 21 (FIG. 9) and the torque rotor 61 (FIG. 6), which opening are slightly larger than the diameter of the push rods 28 (and preferably have been provided with a sliding bearing), the push rods 28 remain freely movable in axial direction (A) in the second induction rotor 21 and the torque rotor 61, while still being able to transmit the rotation of the torque rotor 61 to the induction rotors 20,21 (and the first displacement element 60). In other words, the axial movement or displacement of the first displacement element 60 causes a corresponding axial displacement of the second inductor rotor. This displacement can be accomplished during rotation of the rotors or when the rotors have been stopped.

The inner push pins 29 can be fixedly mounted to the second inductor rotor 21 and a second push element or displacement element 64 while push pins 29 can move freely in axial direction through the openings 70 provided in the torque rotor 61 and openings 71 provided in the first displacement element 60. Similar to the openings 44,52 the diameters of the openings 70 and 71 in the torque rotor 61 and first displacement element 60 are slightly larger than the outer diameter of the push pins 29. Furthermore the openings may be provided sliding bearings to reduce friction. This construction makes it possible to have the second inductor rotor 21, the first displacement element 60 and the second displacement element 64 to co-rotate with the torque rotor 61, while still allowing the inner pins or rods 29 to move in axial direction relative to the torque rotor 61 and the first displacement element 60 so that an axial movement of the second displacement element 64 may cause a corresponding axial movement of the second inductor rotor 21.

Referring to FIGS. 3, 4, 8 and 13 the first displacement element 60 comprises an annular outer part 72 and an annular inner part 73, wherein both parts 72,73 can rotate with respect to each other due the bearing assembly 74 arranged between both parts 72,73. The inner surface of the annular inner part 73 is provided with a threaded surface 75 that is configured to engage in threaded surface 81 of a threaded sleeve 80. Similarly, referring to FIGS. 3, 4, 9 and 13, the second displacement element 64 comprises an annular outer (displacement element) part 77 and an annular inner (displacement element) part 78, wherein both parts 77,78 can rotate with respect to each other due the bearing assembly 79 arranged between both displacement element parts 77,78. The inner surface of the annular inner part 78 is provided with a threaded surface 76 that is configured to engage in threaded surface 81 of the earlier mentioned threaded sleeve 80.

Referring to FIG. 5, it is shown that the threaded surface 81 comprises a first threaded part 82 and a second threaded part 83. The first threaded part 82 and the second threaded part 83 are left hand thread and right hand thread, respectively. Alternatively, the first threaded part 82 and the second threaded part 83 are right hand thread and left hand thread, respectively. This has the effect that when the threaded sleeve surface 81 is rotated (independently of the rotation of the shaft 4) by actuating the positioning mechanism, the first and second displacement elements 60 and 64 are caused to move in opposing axial directions (A). When the first and second displacement elements 60,64 move in axial direction towards each other, their movement causes the inductor plates 20 and 21 to move in axial direction towards each other, thereby reducing the gap ($G_R$, $G_L$, FIGS. 3 and 4) between each of the inductor plates 20,21 and the magnet rotor 30. When on the other hand the first and second displacement elements 60,64 move in axial direction away from each other, their movement causes the inductor plates 20 and 21 to move in axial direction away from each other, thereby increasing the gap between each of the inductor plates 20,21 and the magnet rotor 30.

In order to avoid that when the inner displacement element part 73 of displacement element 60 and inner displacement element part 78 of the displacement element 64 co-rotate with a rotation of the sleeve 80 (which would mean that the displacement elements 60,64 would not move in axial direction or at least less so), a number of stationary rods 16 are mounted to the housing 8. These rods 16 extend in a general axial direction and stop an annular inner displacement element part 73 and/or annular inner displacement element part 78 when rotation of the sleeve 80 and/or the input hub 4 would cause the annular inner displacement element parts to start to move.

One of the advantages of the above-described embodiments is that the construction is relatively simple and lightweight. Furthermore the use of components of standard material and/or size makes the machining operations often less complex and expensive.

Figure 21:
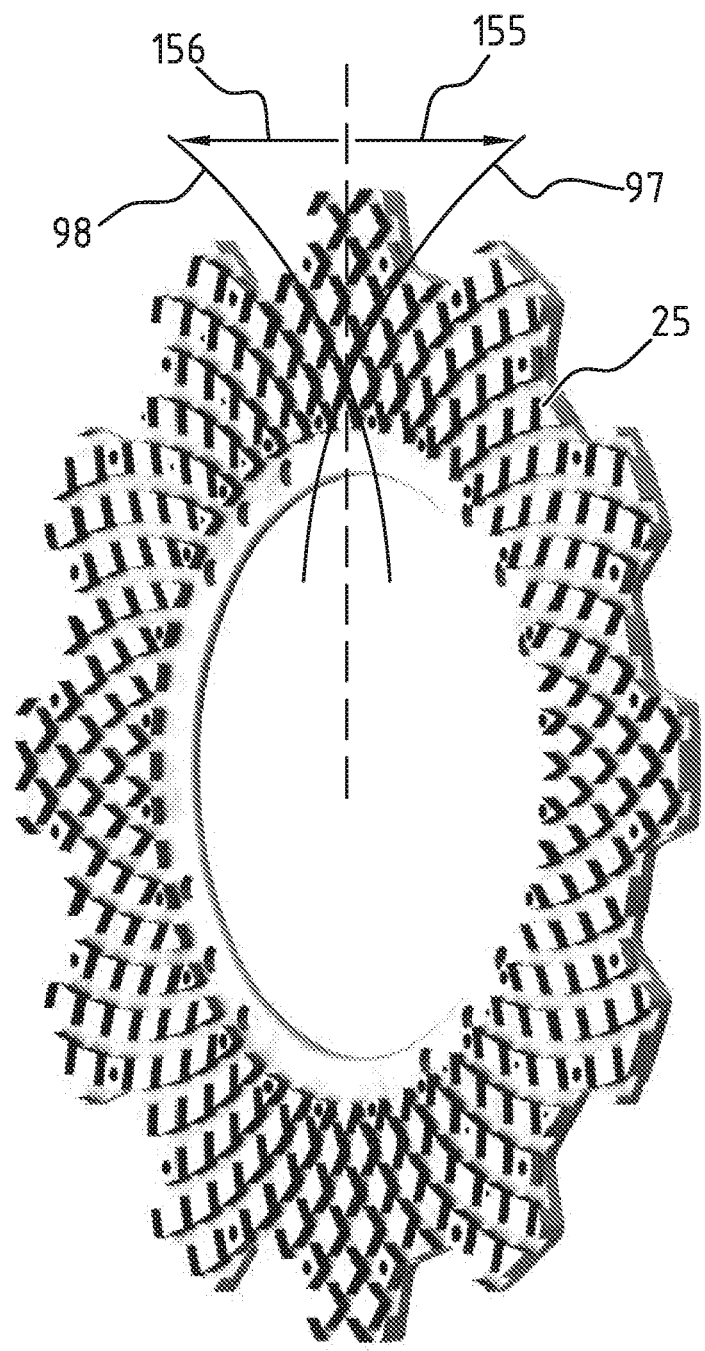
FIG. 21 is a view in perspective of an embodiment of an inductor rotor front plate with a first and second set of channels.

In operation the rotation of the magnet rotor and rotatable inductor rotors 20,21 (which gives rise to slip in de coupling) generate heat to such an extent that the coupling assembly 1 needs to be cooled to avoid overheating. To this end, according to a further aspect, the coupling assembly 1 is configured to cool the rotatable inductions rotors 20,21 by guiding relatively cool ambient air (for instance, at room temperature) into the space between the induction rotors 20,21 and have the air flow along the rotating inductor rotor front elements 24,26. In order to generate this air flow the coupling assembly 1 comprises a ventilator assembly 90 for ventilating at least one of the induction rotors 20,21. In an embodiment entrance openings 160 are provided in the circumferential inner side 95 of the inductor rotor front plate and exit openings 161 are provided in the circumferential outer side 84 of the inductor rotor front plate. In an embodiment the ventilator assembly 90 comprises a circumferential chamber 92 provided in the circular part 91 around the central opening 41 in the rotatable inductor rotor 20. Vanes 93 are arranged in the circumferential inner side 95 of the inductor rotor front plate. In the embodiments shown in FIGS. 1-20 the vanes have been arranged in a circumferential chamber 92. In other embodiments, for instance when an inductor rotor front plate in accordance with FIG. 21, is used, the vanes 93 are formed by the ends of the walls of the front plate between the channels formed therein. Preferably the vanes have are evenly distributed along the circumferential inner side 95.

Rotation of the rotatable inductor rotor 20 induces a local low pressure in the opening 41 so that air is sucked into the space between the rotatable inductor rotor 20 and the magnet rotor 30 (direction 94) and then into the channels 25 provided in the inductor rotor front plate. This air is able to efficiently cool the rotating inductor rotor, as will be explained hereafter.

The entrance openings 160 are configured so as to receive relatively cool air (for instance, ambient air, i.e. air from outside the magnetic coupling assembly, which air has not yet been warmed up by the eddy currents in the inductor rotor and therefore is relatively cool). Typically the temperature of the incoming air has a room temperature (for instance about 20 degrees Celsius). The exit openings 161 are configured to discharge relatively warm air, i.e. air that has entered the entrance openings and that has travelled through the channels 25, during which the air is warmed up by the inductor rotor. The inductor rotor is heated by the eddy currents flowing therein, typically the temperature of the most heated part of the inductor rotor, i.e. the inductor rotor front plate, is as high as 200 degrees Celsius or more. The air exiting the exit openings 161 heated to a temperature in the order of magnitude of 100 degrees Celsius.

The air is sucked in and guided along a number of channels 25 provided in the rotating front element 24. The channels are formed by curved recesses 96 formed in the material of the inductor rotor front plate. The channels may be curved in one direction so as to induce the flow of air through the channels when the rotors are rotating in one rotational direction (first rotational direction). Referring to the embodiments of the inductor rotor front plates of FIGS. 8 and 21, two sets of channels may be provided that allow for the cooling of the induction rotor when the induction rotor rotates on either one of both rotational directions. Referring to the figures, the channels are formed to obtain a first curved trajectory 97 (the channels 25 being curved in a first direction 155, perpendicular to the radial direction) in order to guide the air in case the inductor rotor 20 is rotating in a first rotational direction and a second curved trajectory 98 (wherein the channels are curved in a second direction 156) in order to guide the air in case the inductor rotor 20 is rotating in a second rotational direction, opposite the first direction.

Similarly, a ventilator assembly 90 may provide for ventilation of the other rotatable inductor rotor 21, more specifically the inductor rotor front plate 26 (for instance a copper plate). In this embodiment the ventilator assembly 90 may comprise a circumferential chamber 99 provided in the circular part 100 around the central opening in the rotatable inductor rotor 21. The circumferential chamber 99 has a number of vanes 101 evenly distributed along the recess and rotation of the rotatable inductor rotor 21 induces an air flow through a number of channels 27 provided in the rotating front element 24. The channels are formed by curved recesses formed in the copper material. Whereas in the shown embodiment the ventilator assembly 90 is able to ventilate both of the rotatable inductor rotors 20,21, while in other embodiments only one of the rotatable inductor rotors 20,21 is ventilated.

FIGS. 16-20 show a further embodiment that may have a more compact construction. Similar to the coupling assemblies of FIGS. 1-15 the coupling assembly 110 comprises a rotary input hub 104 and a rotary output hub 105 that can be connected to an input shaft 2 of a driving motor and an output shaft 3, respectively. The magnetic coupling assembly 110 comprises a stationary housing 118 in which an actuating mechanism 122 is arranged. In the shown embodiment the actuating mechanism 122 comprises a worm drive 119. The worm drive 119 comprises a worm screw 120 that meshes with a worm gear 118. The worm screw can be controlled manually by operating a handle or wheel 115 or by controlling an electric motor (not shown) connected with the worm drive 119. Rotation of the worm screw 120 results in rotation of the worm gear 118 around an imaginary axis 113 parallel to the axial direction (A). Rotation of the worm gear 120 results in the rotation of a threaded sleeve 112 mounted to the worm gear. More specifically, the threaded sleeve 112 is coaxial with and arranged to be rotatable around the above-mentioned rotary input axis 104 (using bearing assemblies 116 and 117 arranged between the inner side of the threaded sleeve 112 and the outer side of the input hub 104, similar to the construction used in the previously described embodiments).

The magnetic coupling assembly 110 further comprises a rotatable magnet rotor 129 having the same construction as the rotatable magnet rotor 30 of the previously described embodiment, albeit that the rotatable magnet rotor 129 is supported in a different manner, i.e. the magnet rotor 129 is connected through a number of magnetic rotor pins 135 to a magnetic rotor frame 136 which in turn is connected to the rotary output hub 105. On both sides of the magnetic rotor 129 rotatable induction rotors 130,131 are arranged. The rotatable induction rotors 130,131 can have a similar construction as the previously described induction rotors 20,21, including inductor back plates, front elements, the channels in the front elements shaped so as to allow cooling air to flow along the surface of the inductor rotor front plate and the inductor rotor back plate, etc.

Due to the magnetic forces (fields moving at a different speed than the inductor material generates eddy-currents which in turn generates magnetic fields in the inductor which interact with the permanent magnets in the magnet rotor) between the magnet rotor 129 and the induction rotors 130,131 generated by eddy-currents any rotation of the input hub 104 is transmitted with a circumferential force thus torque generating speed difference to the induction rotors 130,131, from the induction rotors 130,131 (in a contactless manner) to the magnet rotor 129 and from the magnet rotor 129 the output hub 105 connected thereto. The circumferential force between the rotation of the input hub 104 and the rotation of the output hub 105 depends amongst others on the speed difference and the magnetic field strength between the magnet rotor 129 and the induction rotors 130,131.

Figure 17:
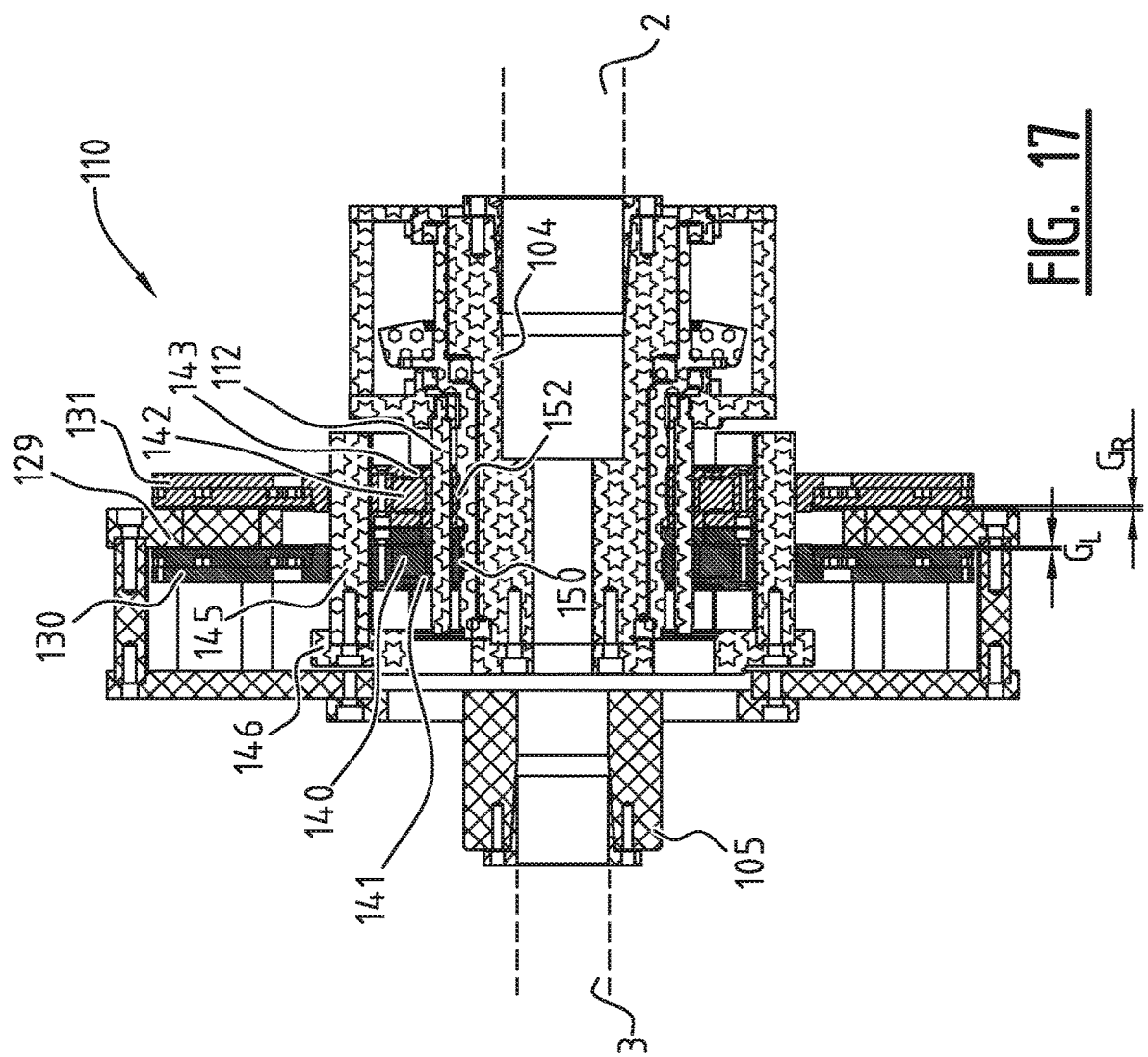
Figure 18:
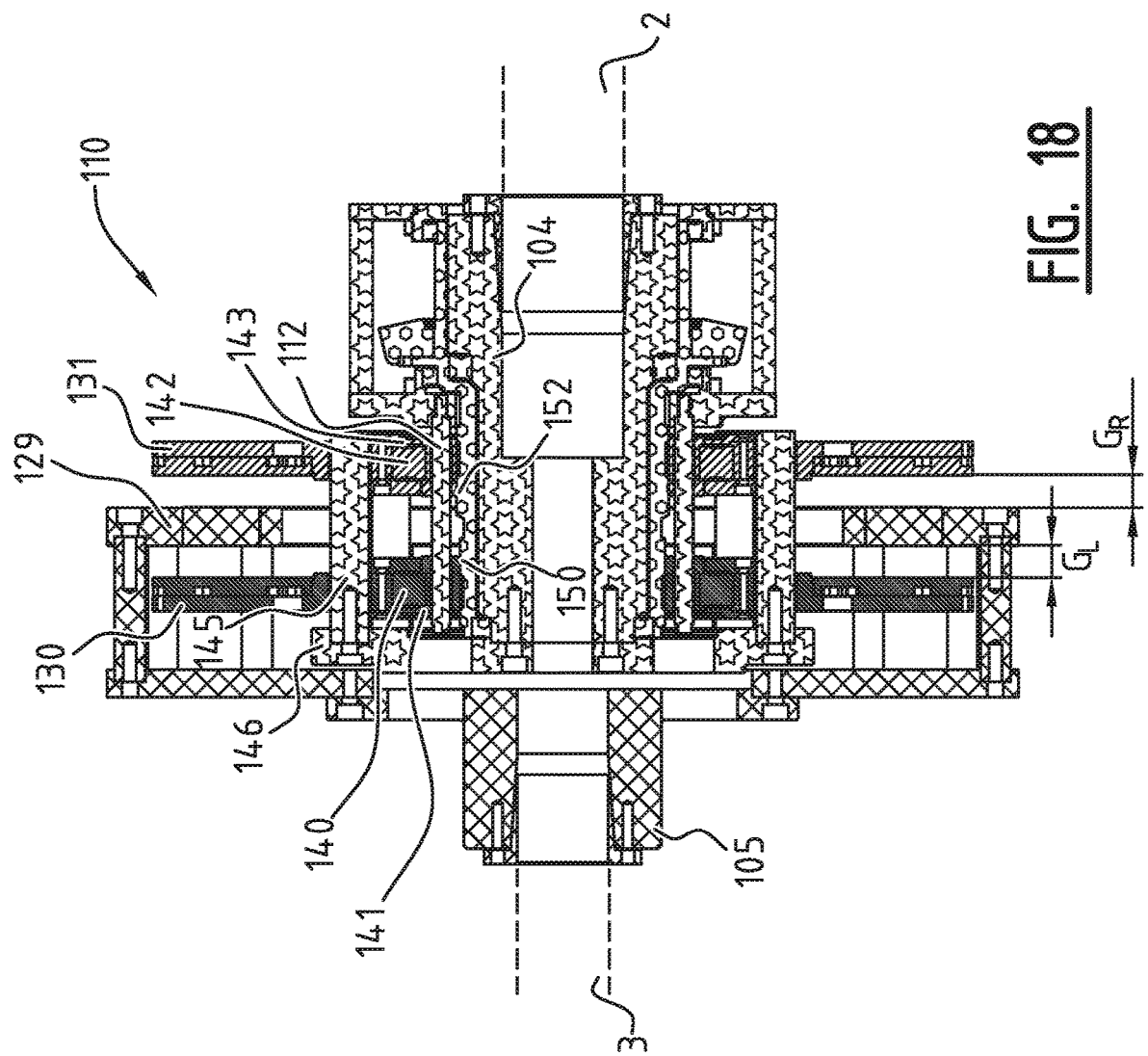
Figure 19:
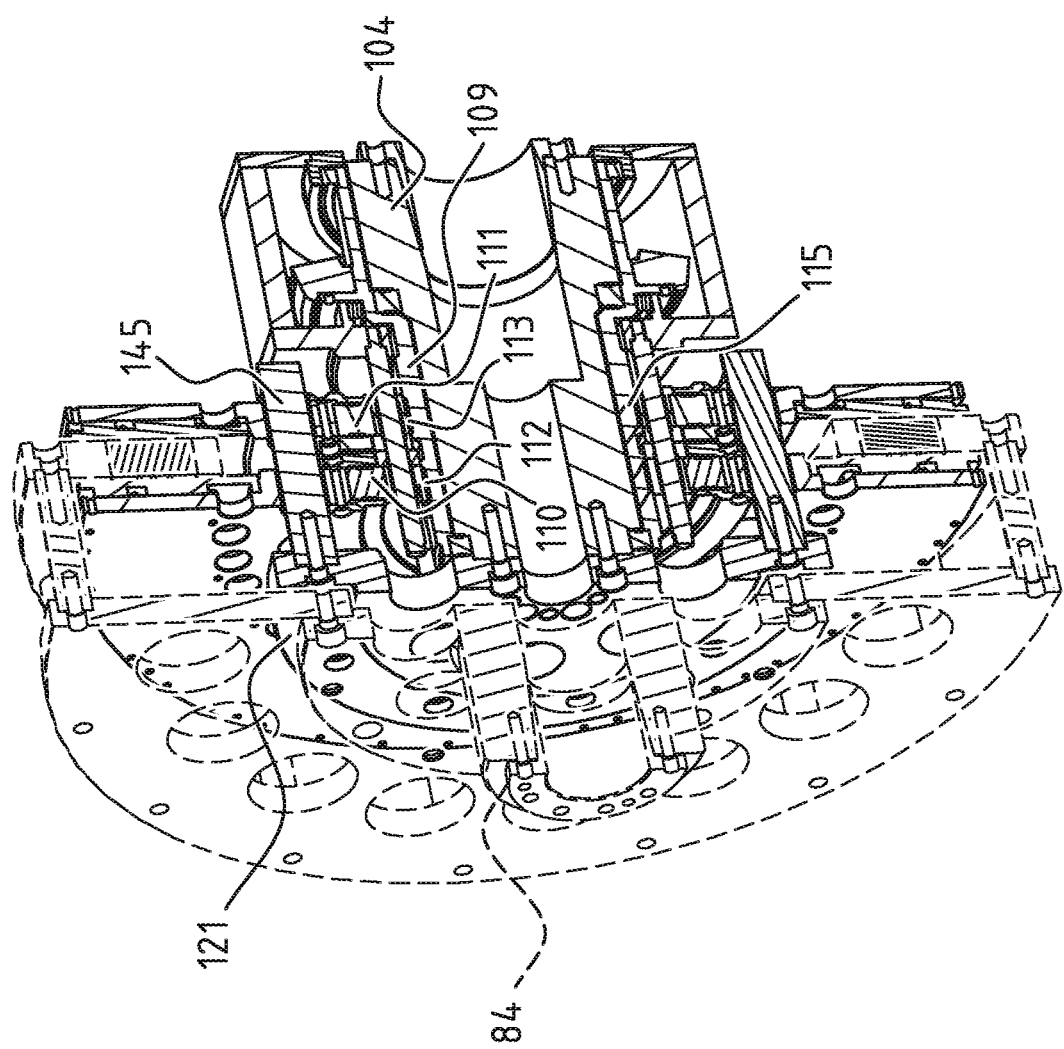
FIGS. 19-20 are side views in perspective of the third embodiment.
Figure 20:
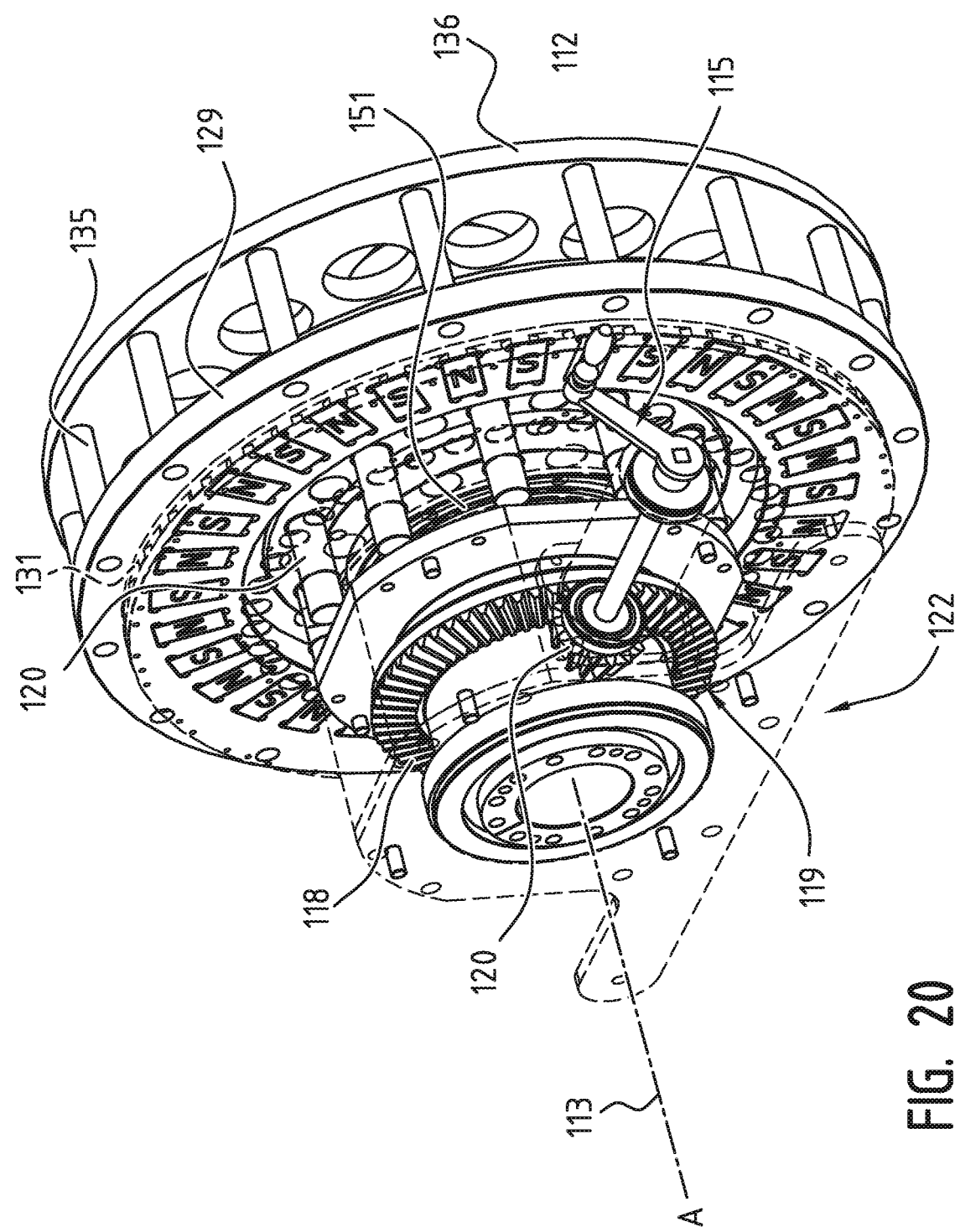

The magnetic field strength between the magnet rotor 129 and the induction rotors 130,131 can be changed by adjustment of the gap between either of the inductor rotors and the magnetic rotor. FIG. 17 shows the situation wherein the gap ($G_L$) between the left induction rotor 130 and the magnet rotor 129 and the gap ($G_R$) between the right induction rotor 131 and the magnet rotor 129 is relatively small, while FIG. 18 represents the situation wherein the gap ($G_L$) between the left induction rotor 130 and the magnet rotor 129 and the gap ($G_R$) between the right induction rotor 131 and the magnet rotor 129 is large.

The left inductor rotor 130 is connected though a bearing 140 with a first displacement element 141 so that the left inductor rotor 130 can rotate freely with respect to the first displacement element 141. The left inductor rotor 130 is caused to rotate by as a result of the presence of torque pins 145 that are connected to the rotating input hub 104 through intermediate element 146 (coupling plate). Similarly, right inductor rotor 131 is connected though a bearing 142 with a second displacement element 143 so that the right inductor rotor 131 can rotate freely with respect to the second displacement element 143. The right inductor rotor 131 is caused to rotate by as a result of the presence of the same torque pins 145. Each pin has end which is connected to the rotating input hub 104 through intermediate element 146 (while the opposite end of each pin is a free end).

The inner surface of the annular displacement element 141 is provided with a threaded surface 150 that is configured to engage in threaded surface 151 of the earlier mentioned threaded sleeve 112. Similarly, the inner surface of the annular displacement element 143 is provided with a threaded surface 151 that is configured to engage in the threaded surface 151 of the earlier mentioned threaded sleeve 112. The threaded surface 151 of the sleeve 112 comprises a first threaded part and a second threaded part. The first threaded part and the second threaded part are left hand thread and right hand thread, respectively. Alternatively, the first threaded part and the second threaded part are right hand thread and left hand thread, respectively. This has the effect that when the threaded sleeve 112 is rotated (independently of the rotation of the shaft 104) by actuating the actuating mechanism, the first and second displacement elements 141 and 143 are caused to move in opposing axial directions (A). When the first and second displacement elements 141,143 move in axial direction towards each other, their movement causes the inductor plates 130 and 130 to move in axial direction towards each other, thereby reducing the gaps (see FIG. 17) between each of the inductor plates and the magnet rotor 129. When on the other hand the first and second displacement elements 141,143 move in axial direction away from each other, their movement causes the inductor plates 130,131 to move in axial direction away from each other, thereby increasing the gap between each of the inductor plates and the magnet rotor 129.

As is clear from the above description the torque rotor of the earlier described embodiments can be dispensed with in the embodiments of FIGS. 16-20. This makes it possible to reduce the length of the coupling assembly 110 (in axial direction A) and provides for a compact design of the coupling assembly.

It is to be understood that the present disclosure is not limited to particular aspects described, and, as such, may vary. It is also to be understood that the terminology used herein is for the purpose of describing particular aspects only, and is not intended to be limiting, since the scope of the present disclosure will be limited only by the appended claims.

The invention claimed is:

1. A magnetic coupling assembly for coupling of a first rotary shaft and a second rotary shaft, comprising:
    a first rotary hub connectable to the first shaft;
    a second rotary hub connectable to the second shaft;
    at least one rotatable inductor rotor arranged to co-rotate with the rotation of the first rotary hub;

at least one rotatable magnet rotor comprising a set of permanent magnets, the magnet rotor connected to the second rotary hub and arranged to co-rotate with the rotation of the second rotary hub, wherein the at least one rotatable inductor rotor and the at least one rotatable magnet rotor are arranged to transfer torque between the at least one magnet rotor and the at least one inductor rotor;

wherein the at least one rotatable inductor rotor comprises a first opening between the circumferential inner side of the at least one rotatable inductor rotor and first rotary hub and further comprises:

an inductor rotor front plate facing the magnet rotor and comprised of a non-magnetic electrically conductive material;

an inductor rotor back plate connected to the back side of the inductor rotor front plate and comprised of magnetic material; and one or more channels inside the rotatable inductor rotor between the inductor rotor front plate and the inductor rotor back plate, wherein the at least one inductor rotor comprises multiple vanes or pins arranged along the circumferential inner side of the inductor rotor to form the one or more channels inside the rotatable inductor rotor, the multiple vanes or pins being configured to induce a local low pressure in a second opening between the circumferential inner side of the inductor rotor and the outer surface of the second rotary hub when the inductor rotor is rotating thereby sucking ambient air into the channels in the inductor rotor and force the air to flow through the channels radially outward to cool the inductor rotor front plate.

2. The magnetic coupling assembly of claim 1, the inductor rotor comprising a plurality of connecting elements, between the inductor rotor front plate and inductor rotor back plate or integrally formed with the inductor rotor front plate and/or the inductor rotor back plate, wherein the one or more channels are formed by the space between the plurality of connecting elements.

3. The magnetic coupling assembly of claim 1, wherein the channels are tubular enclosed channels having an entrance opening for receiving relatively cool air and an exit opening for discharging relatively warm air.

4. The magnetic coupling assembly of claim 1, wherein the vanes are formed by the end portions of the walls formed between neighbouring channels and/or are formed by separate elements, arranged along the circumferential inner surface of the inductor rotor and aligned with the entrance openings of the channels in the inductor rotor.

5. The magnetic coupling assembly of claim 1, wherein entrance openings of the channels are radial entrance openings situated along the circumferential inner side of the inductor rotor front plate and/or the exit openings are radial exit openings situated in the circumferential outer side of the inductor rotor front plate or, wherein entrance openings of the channels are axial entrance openings situated along the circumferential back surface of the induction rotor back plate and/or the exit openings are axial exit openings situated in the circumferential back surface of the inductor rotor back plate.

6. The magnetic coupling assembly of claim 1, wherein the channels are formed of grooves made in the inductor rotor front plate, wherein the grooves are covered by the inductor rotor back plate placed against the inductor rotor front plate, or wherein the channels are formed by a plurality of short walls parts or pins placed one after the other, the short wall parts or pins being arranged between the inductor rotor front plate and inductor rotor back plate or integrally formed with at least one of the inductor rotor front plate and the inductor rotor back plate.

7. The magnetic coupling assembly of claim 1, wherein the non-magnetic electrically conductive material of the inductor rotor is copper, aluminium, lead or brass and/or wherein the magnetic material of the inductor rotor is iron or steel.

8. The magnetic coupling assembly of claim 1, wherein the at least one inductor rotor comprises a circumferential chamber in which multiple radial vanes are arranged for inducing a fluid flow through the central opening and guiding the induced fluid flow through the channels in the inductor rotor.

9. The magnetic coupling assembly of claim 1, wherein the channels in the inductor rotor have curved shapes to provide one or more curved trajectories for the passage of fluid from the central opening radially outward back to the environment.

10. The magnetic coupling assembly of claim 1, wherein the channels in the inductor rotor comprise a first set of channels curved in a first direction to provide a passage of cooling fluid when the inductor rotor is rotating in a first rotational direction and a second set of channels curved in a second direction opposite the first direction to provide a passage of cooling fluid when the inductor rotor is rotating in a second rotational direction, opposite the first rotational direction.

11. The magnetic coupling assembly of claim 1, wherein the channels in the inductor rotor are shaped to allow cooling air to flow along a surface of the inductor rotor back plate and inductor rotor front plate.

* * * * *